(12) United States Patent
Ramakrishnan et al.

(10) Patent No.: US 12,457,651 B2
(45) Date of Patent: Oct. 28, 2025

(54) SYSTEMS AND METHODS FOR AUTOMATIC X2-U/Xn-U LINK SELECTION

(71) Applicant: Outdoor Wireless Networks LLC, Richardson, TX (US)

(72) Inventors: Shanthakumar Ramakrishnan, Westford, MA (US); Irfaan Ahamed Salahuddeen, Acton, MA (US); Vagish Srinivasamurthy, Bangalore (IN); Purnima Venkata Kompella, Bangalore (IN)

(73) Assignee: Outdoor Wireless Networks LLC, Richardson, TX (US)

( * ) Notice: Subject to any disclaimer, the term of this patent is extended or adjusted under 35 U.S.C. 154(b) by 320 days.

(21) Appl. No.: 18/184,313

(22) Filed: Mar. 15, 2023

(65) Prior Publication Data
US 2023/0300915 A1    Sep. 21, 2023

(30) Foreign Application Priority Data
Mar. 15, 2022   (IN) .............................. 202241014065

(51) Int. Cl.
*H04W 76/12* (2018.01)
*H04L 61/5007* (2022.01)

(52) U.S. Cl.
CPC ......... *H04W 76/12* (2018.02); *H04L 61/5007* (2022.05)

(58) Field of Classification Search
CPC .................................................. H04W 76/12
(Continued)

(56) References Cited

U.S. PATENT DOCUMENTS

| 10,531,275 B2 | 1/2020 | Sarjoui et al. |
| 2021/0306904 A1 | 9/2021 | Narasimha et al. |

(Continued)

FOREIGN PATENT DOCUMENTS

| CN | 118317385 A | * | 7/2024 | ............ H04W 88/06 |
| WO | 2021161866 A1 | | 8/2021 | |

OTHER PUBLICATIONS

International Searching Authority, "International Search Report and Written Opinion", from PCT Application No. PCT/US2023/064417 from Foreign Counterpart to U.S. Appl. No. 18/184,313, filed Jun. 27, 2023, pp. 1 through pp. 9, Published in: WO.

*Primary Examiner* — Sibte H Bukhari
(74) *Attorney, Agent, or Firm* — Fogg & Powers LLC

(57) ABSTRACT

Systems and methods for automatic X2-U/Xn-U link selection are provided herein. In one example, a method includes determining whether a local communication link between a first base station (FBS) and a second base station (SBS) is possible. In response to determining that the local communication link is possible, the method includes sending a request, including a local IP address for a FBS BBU, to the SBS for an address suitable for establishing a communication link. The method includes determining whether to include a local IP address for an SBS BBU in a response to the request. In response to determining to include the local IP address for the SBS, the method includes sending the response, including the local IP address for the SBS BBU to the FBS. The method includes establishing the local communication link between the FBS and SBS using the local IP addresses without using a security gateway.

20 Claims, 7 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2021/0321467 A1* | 10/2021 | Hampel | H04W 72/20 |
| 2021/0345454 A1 | 11/2021 | Dhanapal et al. | |
| 2022/0014963 A1 | 1/2022 | Yeh et al. | |

* cited by examiner

SYSTEMS AND METHODS FOR AUTOMATIC X2-U/XN-U LINK SELECTION

CROSS-REFERENCE TO RELATED APPLICATIONS

This application claims priority to IN Provisional Application No. 202241014065, filed on Mar. 15, 2022, and titled "SYSTEMS AND METHODS FOR AUTOMATIC X2-U/XN-U LINK SELECTION," the contents of which are hereby incorporated by reference in their entirety.

BACKGROUND

Evolved Universal Terrestrial Radio Access Network (E-UTRAN) comprises one or more base stations that wirelessly communicate with user equipment (UE) such as smartphones using licensed radio frequency spectrum and the Fourth Generation (4G) Long-Term Evolution (LTE) protocol. The base station of E-UTRAN is called an Evolved Node B (also generally referred to as "eNodeB" or "eNB"). When the eNB connects to the Evolved Packet Core (EPC), it is referred to as an eNB. When the eNB connects to the Fifth Generation Core (5GC), it is referred to as an ng-eNB.

Next Generation Radio Access Network (NG-RAN) comprises one or more base stations that wirelessly communicate with UEs such as smartphones using licensed radio frequency spectrum and the Fifth Generation (5G) New Radio (NR) protocol. The base station of NG-RAN is called a Next Generation Node B (also generally referred to as a "gNodeB" or "gNB"). When the gNB connects to the EPC, it is referred to as an en-gNB. When the gNB connects to the 5GC, it is referred to as a gNB.

3rd Generation Partnership Project (3GPP) provides for a dual connectivity mode of operation where a user equipment (UE) may be configured to utilize resources provided by two different Radio Access Network (RAN) nodes connected via a non-ideal backhaul. A RAN node that handles control plane connectivity of the UE to the core network is referred to as a Master Node (MN) and the other RAN node is referred to as a Secondary Node (SN).

There are multiple types of dual connectivity. One type of dual connectivity is called Intra-E-UTRA Dual Connectivity (DC), which includes an MN and SN that both provide E-UTRA access. For DC, the MN is called an MeNB, and the SN is called an SeNB.

Another type of dual connectivity is generally called Multi-Radio Dual Connectivity (MR-DC), which includes one of the RAN nodes providing 5G NR access and the other RAN node providing either E-UTRA or 5G NR access. There are a number of specific types of MR-DC that depend on how the RAN nodes connect to the core network.

One type of MR-DC includes the MN of the UE being connected to EPC core network and the involved core network entity is the mobility management entity (MME). This type of MR-DC is referred to as E-UTRA-NR Dual Connectivity (EN-DC). EN-DC specifically includes an MN providing E-UTRA access connected to an EPC core network and SN is providing 5G NR access. The MN is called an MeNB, and the SN is called an SgNB or en-gNB. For EN-DC, the MN uses the S1-C protocol for control plane communication with MME. The MN and SN may use the S1-U protocol for user plane communication with SGW of EPC. The MN and SN communicate using the X2-C protocol for control plane and the X2-U protocol for user plane.

Other types of MR-DC include the MN of the UE being connected to the 5GC, and the involved core network entity is the Access and Mobility Function (AMF). The MN uses the NG-C protocol for control plane communication with AMF. The MN and SN may use the NG-U protocol for user plane communication with a User Plane Function (UPF) of 5GC. The MN and SN communicate using the Xn-C protocol for control plane and the Xn-U protocol for user plane.

One type of MR-DC using the 5GC is called NR-E-UTRA Dual Connectivity (NE-DC), which includes an MN providing 5G NR access to a UE 108 that is connected to the 5GC and an SN providing E-UTRA access to the UE. Another type of MR-DC using the 5GC is called NG-RAN E-UTRA-NR Dual Connectivity (NGEN-DC), which includes an MN providing E-UTRA access to a UE that is connected to the 5GC and an SN providing 5G NR access to the UE. Yet another type of MR-DC using the 5GC is called NR-NR Dual Connectivity (NR-n DC), which includes an MN providing 5G NR access to a UE that is connected to 5GC and an SN also providing 5G NR access to the UE.

When a UE connects to an MN providing E-UTRA access to utilize the services of EPC core network and connects to an SN providing 5G NR access, it is said to be in Non-Stand Alone (NSA) mode. EN-DC is an example of NSA mode of operation.

When a UE connects to an MN providing 5G NR access to utilize the services of 5GC core network, it is said to be in Stand Alone (SA) mode. A UE in SA mode may or may not use MR-DC. Types of MR-DC allowed for a UE in SA mode are NE-DC and NR-DC.

A central security gateway (SeGW) function is typically implemented between an operator's core network and RAN nodes to secure communications between the core network and the RAN nodes (for example, eNBs and gNBs). In such implementations, S1-C, S1-U, Ng-C, and Ng-U interface traffic passes through the SeGW to reach the respective core network entities. The central SeGW function can be implemented as a separate physical entity or can be implemented as a part of another node.

In one configuration, even though the X2-interface endpoints lie within the RAN network, X2-interface traffic can pass through SeGW to provide security. This configuration is also referred to here as an "X2 Star" architecture. In the X2 Star architecture, IPSec Tunnel Mode (defined by the relevant IPSec standard) is used for X2-interface communications between the MN and the SN.

One IPSec tunnel is established between the MN and central SeGW wherein the central SeGW assigns a tunnel inner address (TIA) to the MN (MN-TIA). Another IPSec tunnel is established between the SN and central SeGW wherein the central SeGW assigns a TIA to the SN (SN-TIA). The MN-TIA and SN-TIA are used as the transport network layer (TNL) addresses for X2-C, X2-U, Xn-C, and Xn-U protocol traffic over the IPSec tunnels.

X2-C/Xn-C communication between MN and SN is not latency sensitive and hence may be implemented via the IPsec tunnels (through the operator's network). However, using a similar configuration for X2-U/Xn-U packets where every user plane packet generated by one RAN node must travel via the operator's central SeGW and reach the second RAN node sitting in the same customer premises as the first RAN node creates unnecessary latency and reduces RAN throughput.

SUMMARY

In one aspect, a method includes determining, by a first base station, whether a local communication link between the first base station and a second base station is possible.

The method further includes, in response to determining that the local communication link between the first base station and the second base station is possible, sending, by the first base station, a request to the second base station for an address suitable for establishing a communication link between the first base station and the second base station. The request includes a first local Internet Protocol (IP) address for a baseband unit entity of the first base station. The method further includes determining, by the second base station, whether to include a second local IP address for a baseband unit entity of the second base station in a response to the request from the first base station. The method further includes, in response to determining to include the second local IP address for the baseband unit entity of the second base station in the response, sending, by the second base station, the response to the request to the first base station, the response to the request including the second local IP address for the baseband unit entity of the second base station. The method further includes establishing the local communication link between the first base station and the second base station using the first local IP address and the second local IP address without using a security gateway.

In another aspect, a secondary base station includes an interface to communicatively couple the secondary base station to a network. The secondary base station is configured to perform at least some processing associated with implementing an air interface to provide wireless service. The secondary base station is further configured to respond to a request from a master base station for an address suitable for establishing a communication link between the master base station and the secondary base station by: determining whether to include a local IP address for a baseband unit entity of the secondary base station in a response to the request from the master base station; and in response to determining to include the local IP address for the baseband unit entity of the secondary base station in the response, sending the response to the request to the master base station, the response to the request including the local IP address for the baseband unit entity of the secondary base station. The local IP address for the baseband unit entity of the secondary base station is used to establish a local communication link between the master base station and the secondary base station without using a security gateway.

In another aspect, a master base station includes an interface to communicatively couple the master base station to a network. The master base station is configured to perform at least some processing associated with implementing an air interface to provide wireless service. The master base station is further configured to determine whether a local communication link between the master base station and a secondary base station is possible. The master base station is further configured to, in response to determining that the local communication link between the master base station and the secondary base station is possible, send a request to the secondary base station for an address suitable for establishing a local communication link between the master base station and the secondary base station. The request includes a first local network Internet Protocol (IP) address for a baseband unit entity of the master base station. The master base station is further configured to receive a response to the request from the secondary base station, wherein the response to the request includes a second local IP address for a baseband unit entity of the secondary base station. The master base station is further configured to establish the local communication link between the master base station and the secondary base station using the first local IP address and the second local IP address without using a security gateway.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
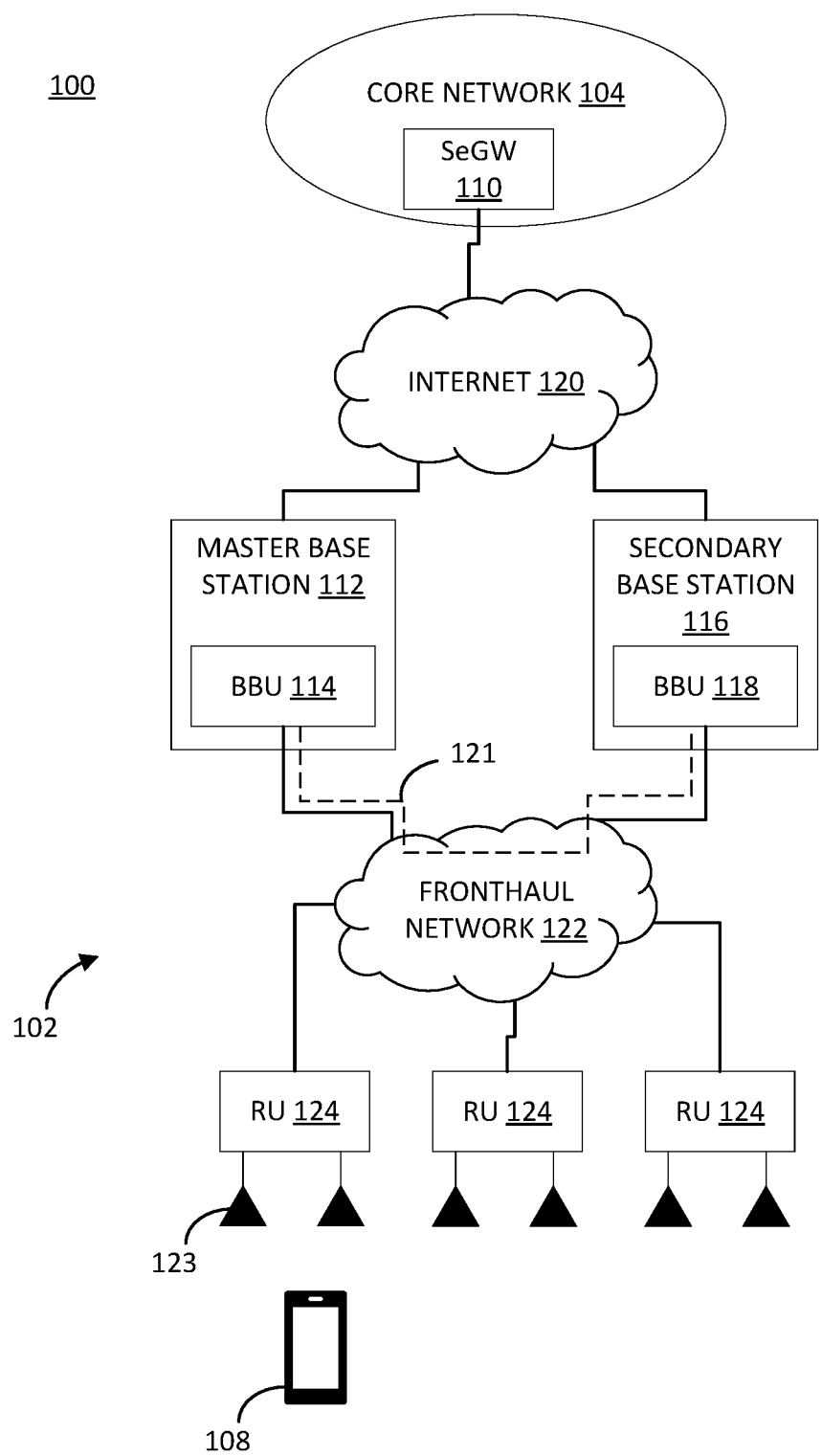
FIG. 1 is a block diagram illustrating an example wireless system in which the X2-U/Xn-U link selection techniques described herein can be used.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be used and that logical, mechanical, and electrical changes may be made. Furthermore, the method presented in the drawing figures and the specification is not to be construed as limiting the order in which the individual acts may be performed. The following detailed description is, therefore, not to be taken in a limiting sense.

Some embodiments described herein utilize a local X2-U link between the MeNB (MN) and SgNB (SN) to address the latency and throughput issues described above. In some examples, the MeNB (MN) and the SgNB (SN) are deployed in the same enterprise/customer premises and utilize a local connection for the X2-U communications rather than communicating through the security gateway as described above. Other embodiments described herein utilize a local Xn-U link between the gNB and an eNB or other gNB to address similar latency and throughput issues as those described above. In some examples, the RAN nodes participating in MR-DC (or DC) are deployed in the same enterprise/customer premises and pass through a centralized SeGW for the X2-U/Xn-U communications rather than direct "local" communication as described above.

FIG. 1 is a block diagram of one exemplary embodiment of a wireless system 100 in which the automatic X2-U/Xn-U link selection techniques described herein can be used.

In the example, shown in FIG. 1, the wireless system 100 comprises a radio access network (RAN) 102 and a core network 104. In this example, the RAN 102 includes a master base station 112 (also referred to herein as a Master Node (MN)) and a secondary base station 116 (also referred to herein as a Secondary Node (SN)) that are used to provide user equipment 108 with mobile access to the wireless network operator's core network 104 in order to enable the user equipment (UE) 108 to wirelessly communicate data and voice. In some examples, the master base station 112 and the secondary base station 116 are configured to operate in a non-standalone mode. In some examples, the master base station 112 and the secondary base station 116 are configured to operate in a Multi-Radio Dual Connectivity (MR-DC) mode as defined by 3GPP standard TS 37.340. The master base station 112 is the radio access node that provides the control-plane connection to the core network 104. The secondary base station 116 is the radio access node with no control-plane connection to the core network 104 that provides additional resources to the UE 108.

In some examples, the master base station 112 is a 4G LTE base station (also referred to herein as "LTE Evolved Node B," "eNodeB," or "eNB") and the secondary base station 116 is a 5G NR base station (also referred to herein as "Next Generation Node B," "gNodeB," or "gNB"). In other examples, the master base station 112 is a 5G NR base station and the secondary base station is a 4G LTE base station. In other examples, the master base station 112 is a 5G NR base station and the secondary base station is also a 5G NR base station.

In the example shown in FIG. 1, the core network 104 includes a Security Gateway (SeGW). In some examples, the core network 104 is implemented as an Evolved Packet Core (EPC) comprising standard LTE EPC network elements. In other examples, the core network 104 is implemented as a 5G Core (5GC) comprising standard 5GC network elements.

In the example shown in FIG. 1, the backhaul between the RAN 102 and the core network 104 is implemented using one or more IP networks (including, in this example, the Internet 120).

In examples where the core network 104 is implemented as an EPC, the master base station 112 communicates with components in the core network 104 using the S1 interface and communicates with the secondary base station 116 using the X2 interface. In such examples, the secondary base station 116 communicates with components in the core network 104 using the S1-U interface and communicates with the master base station 112 using the X2 interface. In examples where the core network 104 is implemented as a 5GC, the master base station 112 communicates with components in the core network 104 using the NG interface and communicates with the secondary base station 116 using the Xn interface. In such examples, the secondary base station 116 communicates with components in the core network 104 using the NG-U interface and communicates with the master base station 112 using the Xn interface.

Each master base station 112 can be implemented using one or more baseband unit (BBU) entities 114 (also referred to herein simply as "BBUs") that interact with multiple remote units 124 (also referred to here as "RUs," "radio units," "radio points," or "RPs") to implement the various base station functions necessary to implement the air-interface and to interact with the core network 104 in order to provide wireless service to various items of user equipment (UEs). In examples where the master base station 112 is a 4G LTE base station, the one or more BBU entities 114 may comprise a single entity (sometimes referred to as a "baseband controller" or simply a "baseband band unit" or "BBU") that performs Layer-3, Layer-2, and some Layer-1 processing for the cell. In this example, each RU 124 is configured to implement the radio frequency (RF) interface and the physical layer functions for the associated base station that are not implemented in the baseband controller. The multiple RUs 124 are typically located remotely from each other (that is, the multiple RUs are not co-located), and the one or more BBU entities 114 are communicatively coupled to the RUs 124 over a fronthaul network 122. In some examples, the fronthaul network 122 is a switched Ethernet fronthaul network (for example, a switched Ethernet network that supports the Internet Protocol (IP)).

In examples where the master base station 112 is a 5G NR base station, the one or more BBU entities 114 may also comprises multiple entities, for example, one or more central unit (CU) entities that implement Layer-3 and non-time critical Layer-2 functions for the associated base station and one or more distributed units (DU) that implement the time critical Layer-2 functions and at least some of the Layer-1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU 124 is configured to implement the radio frequency (RF) interface and the physical layer functions for the associated base station that are not implemented in the DU. The multiple RUs 124 are typically located remotely from each other (that is, the multiple RUs are not co-located), and the one or more BBU entities 114 are communicatively coupled to the RUs 124 over a fronthaul network 122. In some examples, the fronthaul network 122 is a switched Ethernet fronthaul network (for example, a switched Ethernet network that supports the Internet Protocol (IP)).

Similarly, each secondary base station 116 can be implemented using one or more baseband unit (BBU) entities 118 (also referred to herein simply as "BBUs") that interact with multiple RUs 124 to implement the various base station functions necessary to implement the air-interface and to interact with the core network 104 in order to provide wireless service to various items of user equipment (UEs). In examples where the secondary base station 116 is a 4G LTE base station, the one or more BBU entities 118 may comprise a single entity (sometimes referred to as a "baseband controller" or simply a "baseband band unit" or "BBU") that performs Layer-3, Layer-2, and some Layer-1 processing for the cell. In this example, each RU 124 is configured to implement the radio frequency (RF) interface and the physical layer functions for the associated base station that are not implemented in the controller. The multiple RUs 124 are typically located remotely from each other (that is, the multiple RUs are not co-located), and the one or more BBU entities 118 are communicatively coupled to the RUs 124 over a fronthaul network 122. In some examples, the fronthaul network 122 is a switched Ethernet fronthaul network (for example, a switched Ethernet network that supports the Internet Protocol (IP)).

In examples where the secondary base station 116 is a 5G NR base station, the one or more BBU entities 118 may also comprises multiple entities, for example, one or more CU entities that implement Layer-3 and non-time critical Layer-2 functions for the associated base station and one or more DUs that implement the time critical Layer-2 functions and at least some of the Layer-1 (also referred to as the Physical Layer) functions for the associated base station. Each CU can be further partitioned into one or more user-plane and control-plane entities that handle the user-plane and control-plane processing of the CU, respectively. Each such user-plane CU entity is also referred to as a "CU-UP," and each such control-plane CU entity is also referred to as a "CU-CP." In this example, each RU 124 is configured to implement the radio frequency (RF) interface and the physical layer functions for the associated base station that are not implemented in the DU. The multiple RUs 124 are typically located remotely from each other (that is, the multiple RUs are not co-located), and the one or more BBU entities 118 are communicatively coupled to the RUs 124 over a fronthaul network 122. In some examples, the fronthaul network 122 is a switched Ethernet fronthaul network (for example, a switched Ethernet network that supports the Internet Protocol (IP)).

Each RU 124 includes or is coupled to one or more antennas 123 via which downstream radio frequency signals are radiated to UEs 108 and via which upstream radio frequency signals transmitted by UEs 108 are received. In some examples, the one or more antennas 123 includes two or four antennas 123. In one configuration (used, for example, in indoor deployments), the RUs 124 are co-located with respective antennas 123 and remotely located from the one or more BBU entities 114, 118 serving it. In another configuration (used, for example, in outdoor deployments), the antennas 123 for the RUs 124 are deployed in a sectorized configuration (for example, mounted at the top of a tower or mast). In such a sectorized configuration, the RUs 124 need not be co-located with the respective antennas 123 and, for example, can be located at the base of the tower or mast structure, for example, and, possibly, co-located with its serving one or more BBU entities 114, 118.

In the example shown in FIG. 1, the master base station 112 and the secondary base station 116 are implemented using the same RUs 124 and antennas 123. That is, the master base station 112 and the secondary base station 116 share RUs 124 and antennas 123. In other examples, the master base station 112 is implemented using respective RUs 124 and antennas 123 that are different than the RUs 124 and antennas 123 used to implement the secondary base station 116.

In the example showing FIG. 1, only one master base station 112 and only one secondary base station 116 are shown. It should be understood that a different number of master base stations 112 and/or secondary base stations 116 could be used to implement the RAN 102.

During commissioning or deployment of a secondary base station 116, an association between the master base station 112 and the secondary base station 116 can be established. Such an association can be established using a service management and orchestration (SMO) entity (for example, an Operations and Maintenance (OAM) entity or a Device Management System (DMS)). The BBU entity 114 of the master base station 112 is configured to provide a bearer-tunnel inner address (TIA) to the SMO entity, and the SMO entity provides the bearer-TIA to the BBU entity 118 of the secondary base station 116. In some examples, the communications with the SMO entity occur via respective IPsec tunnels between the SeGW 110 and the base stations 112, 116.

Using the IPsec tunnel between the BBU entity 118 of the secondary base station 116 and the SeGW 110 and the IPsec tunnel between the SeGW 110 and the BBU entity 114 of the master base station 112, the BBU entity 118 of the secondary base station 116 sends a X2-C setup request (for example, where the core network 104 is an EPC) or Xn-C setup request (for example, where the core network 104 is a 5GC) to the BBU entity 114 of the master base station 112. Using the IPsec tunnels, the BBU entity 114 of the master base station 112 sends a X2-C setup response (for example, where the core network 104 is an EPC) or Xn-C setup response (for example, where the core network 104 is a 5GC) to the BBU entity 118 of the secondary base station 116.

The master base station 112 can also use the SeGW 110 to transmit X2-U or Xn-U communications with the secondary base station 116. However, as discussed above, using the SeGW 110 is not ideal since doing so can introduce latency and decreases throughput for user plane data. The master base station 112 is configured to determine whether a local connection is possible between the master base station 112 and the secondary base station 116. This determination can take place at any point prior to establishing the X2-U or Xn-U communication link between the master base station 112 and the secondary base station 116. In some examples, the determination includes the master base station 112 sending a neighbor solicitation message to the secondary base station 116. If the secondary base station 116 sends a neighbor advertisement message back to the master base station 112, then it is determined that a local connection is possible between the master base station 112 and the secondary base station 116. However, if no neighbor advertisement message is received from the secondary base station 116, then it is determined that a local connection is not possible between the master base station 112 and the secondary base station 116.

When a new UE 108 that supports multiple Tx/Rx connects to the master base station 112, the master base station 112 and the secondary base station 116 can be used to provide resources to the new UE 108. Upon receiving measurements from the new UE 108, the master base station 112 sends a request to the secondary base station 116 for an address suitable for establishing an X2-U or Xn-U communication link between the master base station 112 and the secondary base station 116 using the X2-C or Xn-C IPsec tunnel between the BBU entity 114 of the master base station 112 and the SeGW 110 and the X2-C or Xn-C IPsec tunnel between the SeGW 110 and the BBU entity 118 of the secondary base station 116. In some examples, the request is included as part of an addition request message to the secondary base station 116. If a local connection between the master base station 112 and the secondary base station 116 is possible, then the master base station 112 includes a local IP address for the BBU entity 114 of the master base station 112 in the request message. If a local connection between the master base station 112 and the secondary base station 116 is not possible, then the master base station 112 includes a TIA for the BBU entity 114 of the master base station 112 in the request message.

Upon receipt of the addition request from the master base station 112, the secondary base station 116 is configured to determine whether to include a local IP address in a response to the request message from the master base station 112. In some examples, the secondary base station 116 checks the request message to determine if a local IP address of the BBU entity 114 of the master base station 112 is included in the request message. If a local IP address of the BBU entity 114 of the master base station 112 is included in the response message, then the secondary base station 116 includes a local IP address for the BBU entity 118 of the secondary base station 116 in the request message. If a local IP address of the BBU entity 114 of the master base station 112 is not included in the response message (for example, the TIA of the BBU entity 114 of the master base station 112 is included), then the secondary base station 116 includes a TIA for the BBU entity 118 of the secondary base station 116 in the response to the request message.

In examples where the secondary base station 116 is a 4G LTE base station (for example, in FIG. 4), the secondary base station 116 is configured to provide the local IP address or TIA of the baseband controller. In examples where the secondary base station 116 is a 5G NR base station (for example, in FIGS. 2-3 and 5), the secondary base station 116 is configured to provide the local IP address or TIA of the CU-UP instance selected to host the new UE's Protocol Data Unit (PDU) session. The CU-UP instance can be selected, for example, using load balancing policies in the secondary base station 116.

When the request message from the master base station 112 includes a local IP address for the BBU entity 114 and the response from the secondary base station 116 includes a local IP address for the BBU entity 118, the master base station 112 is configured to establish a local communication link 121 for X2-U or Xn-U communications using the local IP addresses and without using the SeGW 110. In the example shown in FIG. 1, the network used to implement the fronthaul network 122 (for example, a switched Ethernet network) is also used to provide the local communication link 121 between the BBU entities 114, 118. In other examples, the local communication link 121 between the BBU entities 114, 118 is provided in a different manner. For example, the local communication link 121 could be provided by a physical or "virtual" link or network used for fronthaul, midhaul, backhaul, or other purposes (for example, used solely for management plane communications or communications with a RAN Intelligent Controller (RIC)). A "virtual" link or network could be provided in a virtualization environment used to implement the master base station 112 and the secondary base station 116.

In some examples, the local IP addresses of the BBU entities 114, 118 are standard IP addresses. In some examples, the local IP addresses of the BBU entities 114, 118 are link-local IP addresses (for example, when the BBU entities 114, 118 are placed across switches). In some examples, the local IP addresses of the BBU entities 114, 118 are routable IP addresses (for example, when the BBU entities 114, 118 are placed across routers). In such examples, the local IP addresses of the BBU entities 114, 118 can be IPV4 addresses or IPV6 addresses.

When the request message from the master base station 112 includes the TIA for the BBU entity 114 and the response from the secondary base station 116 includes the TIA for the BBU entity 118, the master base station 112 is configured to establish a communication link for X2-U communications using the TIAs and using the SeGW 110.

Also, if the request from the master base station 112 requires low latency connectivity and that is not available, the secondary base station 116 can accept the bearer but will not split the traffic.

Figure 2:
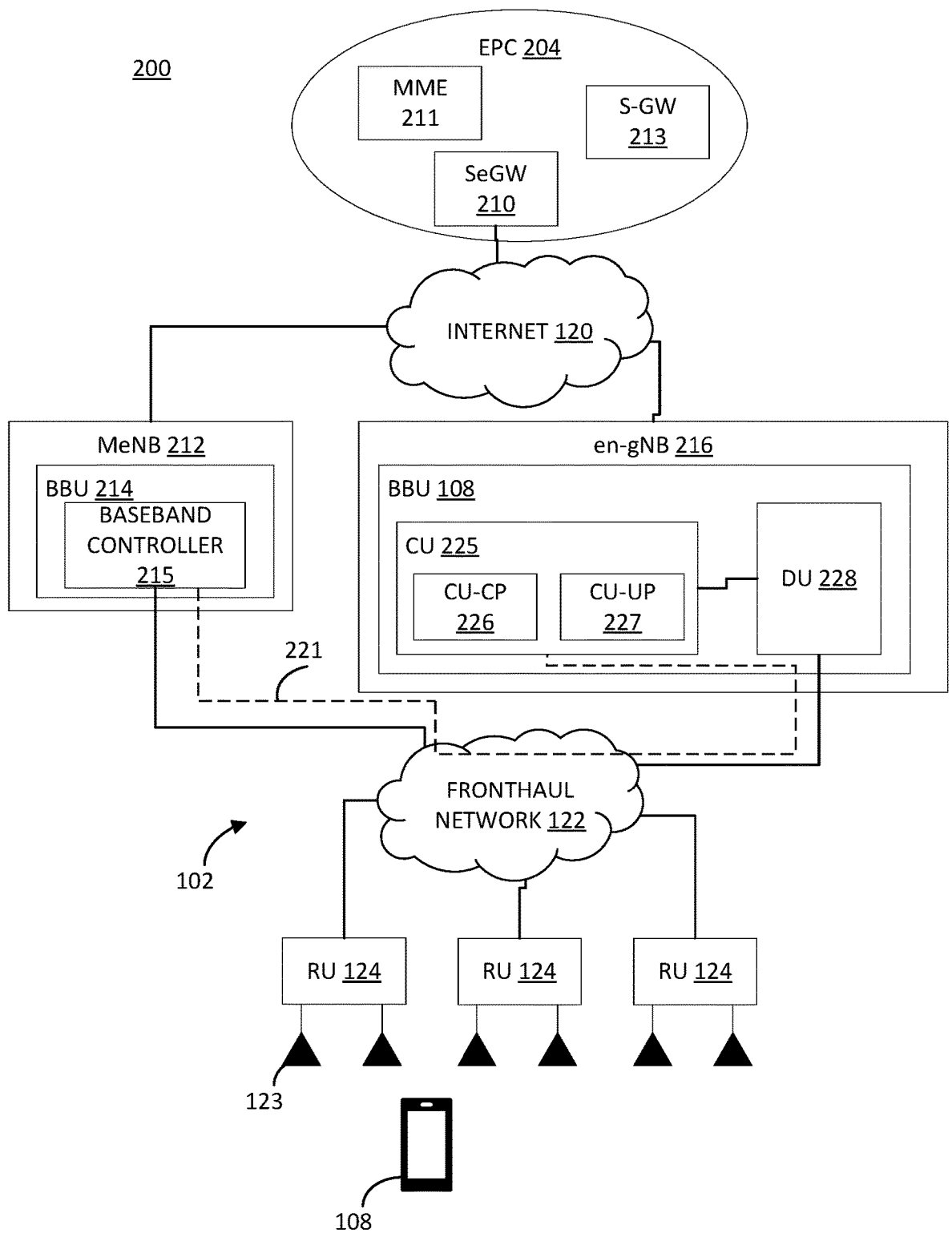
FIG. 2 is a block diagram illustrating an example wireless system in which the X2-U link selection techniques described herein can be used.

FIG. 2 is a block diagram of one exemplary embodiment of a wireless system 200 in which the automatic X2-U link selection techniques described herein can be used. FIG. 2 is a specific example of the system shown in FIG. 1. The same numerals from FIG. 1 are used for like features in FIG. 2 and similar numerals compared to those used in FIG. 1 are used for features that are modified for the specific example shown in FIG. 2.

In the example shown in FIG. 2, the wireless system 200 comprises a radio access network (RAN) 202 and a core network 204. In this example, the RAN 202 is implemented as an evolved UTRAN (e-UTRAN) radio access network providing wireless service using 4G LTE and 5G NR air interfaces. 4G LTE and 5G NR are standards developed by the 3GPP standards organization.

The E-UTRAN comprises a set of base stations 212, 216 that wirelessly communicate with UEs 108 (such as smartphones) using licensed radio frequency spectrum. E-UTRAN 202 supports Multi-Radio Dual Connectivity (MR-DC) via E-UTRA-NR Dual Connectivity (EN-DC). For EN-DC, a UE 108 is connected to a 4G LTE base station 212 (also generally referred to as an "eNodeB" or "eNB") and a 5G NR base station 216 (also generally referred to as a "gNodeB" or "gNB"). The eNB 212 provides the control-plane connection to the core network 204 and acts as the master base station 112 (or Master Node (MN)) in EN-DC. The eNB 212 is also referred to as an "MeNB 212" in this example. The gNB 216 provides 5G NR user-plane and control-plane protocol terminations towards the UE 108 and acts as the secondary base station (or Secondary Node (SN)) in EN-DC. The gNB 216 is also referred to as an "en-gNB 216" in this example.

In the example shown in FIG. 2, the RAN 202 comprises at least one MeNB 212 and at least one en-gNB 216 that are used to provide UEs 108 with mobile access to the wireless network operator's core network 204 in order to enable the user equipment 108 to wirelessly communicate data and voice. In this example, the MeNB 212 and the ne-gNB 216 are configured to operate in NSA mode.

In the example shown in FIG. 2, the core network 204 is implemented as an Evolved Packet Core (EPC) comprising standard LTE EPC network elements such as, for example, a mobility management entity (MME) 211, a Serving Gateway (S-GW) 213, and a Security Gateway (SeGW) 210.

In the example shown in FIG. 2, the backhaul between the RAN 202 and the EPC 204 is implemented using one or more IP networks (including, in this example, the Internet 120).

In this example, the MeNB 212 communicates with the MME 211 and S-GW 213 in the EPC 204 using the S1 interface and communicates with other 4G LTE base stations 212 and the en-gNB 216 using the X2 interface. In some examples, the en-gNB 216 communicates with the S-GW 213 in the EPC 204 using the S1-U interface, communicates with the MeNB 212 using the X2 interface, and communicates with other 5G NR base stations 216 using the X2-U interface.

The MeNB 212 is implemented using one or more BBU entities 114 and one or more RUs 124 located remotely from the one or more BBU entities 114. These components implement the various base station functions necessary to implement the 4G LTE air-interface and to interact with the EPC 204. For the MeNB 212, the BBU entity 114 is implemented by a central unit (also referred to as a "baseband controller") 215 that performs Layer-3, Layer-2, and some Layer-1 processing for the cell. The multiple RUs 124 are typically located remotely from each other (that is, the multiple RUs are not co-located) are communicatively coupled to the baseband controller 215 over a fronthaul network 122. In some examples, the fronthaul network 122 is a switched Ethernet fronthaul network (for example, a switched Ethernet network that supports the Internet Protocol (IP)).

The en-gNB 216 is implemented using one or more BBU entities 118 and one or more RUs 124 located remotely from the one or more BBU entities 118. These components implement the various base station functions necessary to implement the 5G NR air-interface and to interact with the EPC 204. For the en-gNB 216, the BBU entity 118 is implemented by one or more central unit (CU) entities 225 that implement Layer-3 and non-time critical Layer-2 functions for the en-gNB 216 and one or more distributed units (DUs) 228 that implement the time critical Layer-2 functions and at least some of the Layer-1 (also referred to as the Physical Layer) functions for the en-gNB 216. Each CU 225 can be further partitioned into one or more user-plane and control-plane entities that handle the user-plane and control-plane processing of the CU, respectively. Each such user-plane CU entity is also referred to as a "CU-UP 227," and each such control-plane CU entity is also referred to as a "CU-CP 226." In this example, each RU 124 is configured to implement the radio frequency (RF) interface and the physical layer functions for the associated base station that are not implemented in the DU 228.

In the example shown in FIG. 2, the MeNB 212 and the en-gNB 216 include or are coupled to one or more antennas 123 via which downstream radio frequency signals are radiated to UEs 108 and via which upstream radio frequency signals transmitted by UEs 108 are received. In the example shown in FIG. 2, the MeNB 212 and the en-gNB 216 are implemented using the same RUs 124 and antennas 123. That is, the MeNB 212 and the en-gNB 216 share RUs 124 and antennas 123. In other examples, the MeNB 212 is implemented using respective RUs 124 and antennas 123 that are different than the RUs 124 and antennas 123 used to implement the en-gNB 216.

In the example showing FIG. 2, only one MeNB 212 and only one en-gNB 216 are shown. It should be understood that a different number of 4G LTE base stations 212 and/or 5G NR base stations 216 could be used to implement the RAN 202.

During commissioning or deployment of the en-gNB 216, an association between the MeNB 212 and the en-gNB 216 can be established. Such an association can be established using a service management and orchestration (SMO) entity (for example, an Operations and Maintenance (OAM) entity or a Device Management System (DMS)). The baseband controller 215 of the MeNB 212 is configured to provide a bearer-tunnel inner address (TIA) to the SMO entity, and the SMO entity provides the bearer-TIA to the CU-CP 226 of the en-gNB 216. In some examples, the communications with the SMO entity occur via respective IPsec tunnels between the SeGW 210 and the MeNB 212 and the en-gNB 216.

Using the IPsec tunnel between the CU-CP 226 of the en-gNB 216 and the SeGW 210 and the IPsec tunnel between the SeGW 210 and the baseband controller 215 of the MeNB 212, the CU-CP 226 of the en-gNB 216 sends a X2-C setup request to the baseband controller 215 of the MeNB 212. Using the IPsec tunnels, the baseband controller 215 of the MeNB 212 sends a X2-C setup response to the CU-CP 226 of the en-gNB 216.

The MeNB 212 can also use the SeGW 210 to transmit X2-U communications with the en-gNB 216. However, as discussed above, using the SeGW 210 is not ideal since doing so can introduce latency and decreases throughput for user plane data. The MeNB 212 is configured to determine whether a local connection is possible between the MeNB 212 and the en-gNB 216. This determination can take place at any point prior to establishing the X2-U communication link between the MeNB 212 and the en-gNB 216. In some examples, the determination includes the MeNB 212 sending a neighbor solicitation message to the en-gNB 216. If the secondary base station sends a neighbor advertisement message back to the MeNB 212, then it is determined that a local connection is possible between the MeNB 212 and the en-gNB 216. However, if no neighbor advertisement message is received from the en-gNB 216, then it is determined that a local connection is not possible between the MeNB 212 and the en-gNB 216.

When a new UE 108 that supports multiple Tx/Rx connects to the MeNB 212, the MeNB 212 and the en-gNB 216 can be used to provide resources to the new UE 108. Upon receiving measurements from the new UE 108, the MeNB 212 sends a request to the en-gNB 216 for an address suitable for establishing an X2-U communication link between the MeNB 212 and the en-gNB 216 using the X2-C IPsec tunnel between the baseband controller 215 of the MeNB 212 and the SeGW 210 and the X2-C IPsec tunnel between the SeGW 210 and the CU-CP 226 of the en-gNB 216. In some examples, the request is included as part of an addition request message to the en-gNB 216. If a local connection between the MeNB 212 and the en-gNB 216 is possible, then the MeNB 212 includes a local IP address for the baseband controller 215 of the MeNB 212 in the request message. If a local connection between the MeNB 212 and the en-gNB 216 is not possible, then the MeNB 212 includes a TIA for the baseband controller 215 of the MeNB 212 in the request message.

Upon receipt of the addition request from the MeNB 212, the en-gNB 216 is configured to determine whether to include a local IP address in a response to the request message from the MeNB 212. In some examples, the en-gNB 216 checks the request message to determine if a local IP address of the baseband controller 215 of the MeNB 212 is included in the request message. If a local IP address of the baseband controller 215 of the MeNB 212 is included in the response message, then the en-gNB 216 includes a local IP address for the CU-UP instance 227 of the en-gNB 216 in the request message. If a local IP address of the baseband controller 215 of the MeNB 212 is not included in the response message (for example, the TIA of the baseband controller 215 of the MeNB 212 is included), then the en-gNB 216 includes a TIA for the CU-UP instance 227 of the en-gNB 216 in the response to the request message.

The en-gNB 216 is configured to provide the local IP address or the TIA of the CU-UP instance 227 selected to host the new UE's Protocol Data Unit (PDU) session. The CU-UP instance 227 can be selected, for example, using load balancing policies in the en-gNB 216.

When the request message from the MeNB 212 includes a local IP address for the baseband controller 215 and the response from the en-gNB 216 includes a local IP address for the CU-UP instance 227, the MeNB 212 is configured to establish a local communication link 221 for X2-U communications using the local IP addresses and without using the SeGW 210. In the example shown in FIG. 2, the network used to implement the fronthaul network 122 (for example, a switched Ethernet network) is also used to provide the local communication link 221 between the baseband controller 215 and the CU-UP instance 227. In other examples, the local communication link 221 between the baseband controller 215 and the CU-UP instance 227 is provided in a different manner. For example, the local communication link 221 could be provided by a physical or "virtual" link or network used for fronthaul, midhaul, backhaul, or other purposes (for example, used solely for management plane communications or communications with a RAN Intelligent Controller (RIC)). A "virtual" link or network could be provided in a virtualization environment used to implement the MeNB 212 and the en-gNB 216.

In some examples, the local IP addresses of the baseband controller 215 and the CU-UP instance 227 are standard IP addresses. In some examples, the local IP addresses of the baseband controller 215 and the CU-UP instance 227 are link-local IP addresses (for example, when the baseband controller 215 and the CU-UP instance 227 are placed across switches). In some examples, the local IP addresses of the baseband controller 215 and the CU-UP instance 227 are routable IP addresses (for example, when the baseband controller 215 and the CU-UP instance 227 are placed across routers). In such examples, the local IP addresses of the baseband controller 215 and the CU-UP instance 227 are IPv4 addresses or IPv6 addresses.

When the request message from the MeNB 212 includes the TIA for the baseband controller 215 and the response from the en-gNB 216 includes the TIA for the CU-UP instance 227, the MeNB 212 is configured to establish a communication link for X2-U communications using the TIAs and using the SeGW 210.

Figure 3:
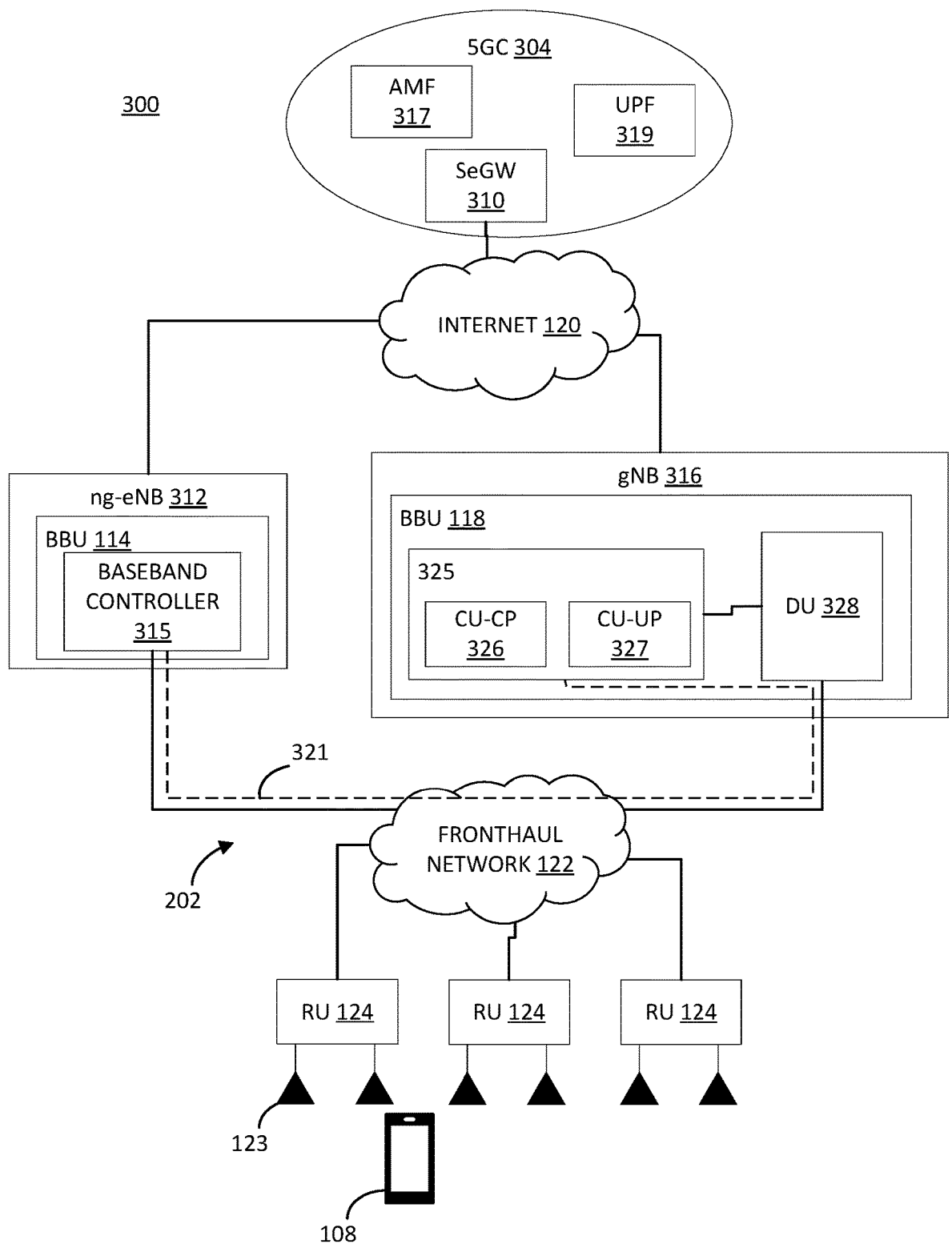
FIGS. 3-5 are block diagrams illustrating example wireless systems in which the Xn-U link selection techniques described herein can be used.

FIG. 3 is a block diagram of one exemplary embodiment of a wireless system 300 in which the automatic Xn-U link selection techniques described herein can be used. FIG. 3 is a specific example of the system shown in FIG. 1. The same numerals from FIG. 1 are used for like features in FIG. 3 and similar numerals compared to those used in FIG. 1 are used for features that are modified for the specific example shown in FIG. 3.

In the example shown in FIG. 3, the wireless system 300 comprises a radio access network (RAN) 302 and a core network 304. In this example, the RAN 302 is implemented as a Next Generation Radio Access Network (NG-RAN) providing wireless service using 4G LTE and 5G NR air interfaces. 4G LTE and 5G NR are standards developed by the 3GPP standards organization.

The NG-RAN comprises a set of base stations 312, 316 that wirelessly communicate with UEs 108 (such as smartphones) using licensed radio frequency spectrum. NG-RAN 302 supports Multi-Radio Dual Connectivity (MR-DC) via NG-RAN E-UTRA-NR Dual Connectivity (NGEN-DC). For NGEN-DC, a UE 108 is connected to a 4G LTE base station 312 (also generally referred to as an "eNodeB" or "eNB") and a 5G NR base station 316 (also generally referred to as a "gNodeB" or "gNB"). The eNB 312 provides the E-UTRA user plane and control plane protocol terminations toward the UE and acts as the master base station 112 (or Master Node (MN)) in NGEN-DC. The eNB 312 is also referred to as an "ng-eNB 312" in this example. The gNB 316 provides 5G NR user-plane and control-plane protocol terminations towards the UE 108 and acts as the secondary base station (or Secondary Node (SN)) in NGEN-DC.

In the example shown in FIG. 3, the RAN 302 comprises at least one ng-eNB 312 and at least one gNB 316 that are used to provide UEs 108 with mobile access to the wireless network operator's core network 304 in order to enable the UEs 108 to wirelessly communicate data and voice. In this example, the ng-eNB 312 and the gNB 316 are configured to operate in SA mode.

In the example shown in FIG. 3, the core network 304 is implemented as a 5G Core (5GC) comprising standard 5GC network elements such as, for example, an Access and Mobility Function (AMF) 317, a User Plane Function (UPF) 319, and a Security Gateway (SeGW) 310.

In the example shown in FIG. 3, the backhaul between the RAN 302 and the 5GC 304 is implemented using one or more IP networks (including, in this example, the Internet 120).

In this example, the ng-eNB 312 communicates with the AMF 317 and UPF 319 in the 5GC 304 using the NG interface and communicates with other base stations 312 and the gNB 216 using the Xn interface. In some examples, the gNB 316 communicates with the UPF 319 in the 5GC 304 using the NG-U interface, communicates with the ng-eNB 312 using the Xn interface, and communicates with other 5G NR base stations 216 using the Xn-U interface.

The ng-eNB 312 is implemented using one or more BBU entities 114 and one or more RUs 124 located remotely from the one or more BBU entities 114. These components implement the various base station functions necessary to implement the 4G LTE air-interface and to interact with the 5GC 304. For the ng-eNB 312, the BBU entity 114 is implemented by a central unit (also referred to as a "baseband controller") 315 that performs Layer-3, Layer-2, and some Layer-1 processing for the cell. The multiple RUs 124 are typically located remotely from each other (that is, the multiple RUs are not co-located) are communicatively coupled to the baseband controller 315 over a fronthaul network 122. In some examples, the fronthaul network 122 is a switched Ethernet fronthaul network (for example, a switched Ethernet network that supports the Internet Protocol (IP)).

The gNB 316 is implemented using one or more BBU entities 118 and one or more RUs 124 located remotely from the one or more BBU entities 118. These components implement the various base station functions necessary to implement the 5G NR air-interface and to interact with the 5GC 304. For the gNB 316, the BBU entity 118 is implemented by one or more central unit (CU) entities 325 that implement Layer-3 and non-time critical Layer-2 functions for the gNB 316 and one or more distributed units (DUs) 328 that implement the time critical Layer-2 functions and at least some of the Layer-1 (also referred to as the Physical Layer) functions for the gNB 316. Each CU 325 can be further partitioned into one or more user-plane and control-plane entities that handle the user-plane and control-plane processing of the CU, respectively. Each such user-plane CU entity is also referred to as a "CU-UP 327," and each such control-plane CU entity is also referred to as a "CU-CP 326." In this example, each RU 124 is configured to implement the radio frequency (RF) interface and the physical layer functions for the associated base station that are not implemented in the DU 328.

In the example shown in FIG. 3, the ng-eNB 312 and the gNB 316 include or are coupled to one or more antennas 123 via which downstream radio frequency signals are radiated to UEs 108 and via which upstream radio frequency signals transmitted by UEs 108 are received. In the example shown in FIG. 3, the ng-eNB 312 and the gNB 316 are implemented using the same RUs 124 and antennas 123. That is, the ng-eNB 312 and the gNB 316 share RUs 124 and antennas 123. In other examples, the ng-eNB 312 is implemented using respective RUs 124 and antennas 123 that are different than the RUs 124 and antennas 123 used to implement the gNB 316.

In the example showing FIG. 3, only one ng-eNB 312 and only one gNB 316 are shown. It should be understood that a different number of 4G LTE base stations 312 and/or 5G NR base stations 316 could be used to implement the RAN 302.

During commissioning or deployment of a gNB 316, an association between the ng-eNB 312 and the gNB 316 can be established. Such an association can be established using a service management and orchestration (SMO) entity (for example, an Operations and Maintenance (OAM) entity or a Device Management System (DMS)). The baseband controller 315 of the ng-eNB 312 is configured to provide a bearer-tunnel inner address (TIA) to the SMO entity, and the SMO entity provides the bearer-TIA to the CU-CP 326 of the gNB 316. In some examples, the communications with the SMO entity occur via respective IPsec tunnels between the SeGW 310 and the ng-eNB 312 and the gNB 316.

Using the IPsec tunnel between the CU-CP 326 of the gNB 316 and the SeGW 110 and the IPsec tunnel between the SeGW 110 and the baseband controller 315 of the ng-eNB 312, the CU-CP 326 of the gNB 316 sends an Xn-C setup request to the baseband controller 315 of the ng-eNB 312. Using the IPsec tunnels, the baseband controller 315 of the ng-eNB 312 sends an Xn-C setup response to the CU-CP 326 of the gNB 316.

The ng-eNB 312 can also use the SeGW 110 to transmit Xn-U communications with the gNB 316. However, as discussed above, using the SeGW 110 is not ideal since doing so can introduce latency and decreases throughput for user plane data. The ng-eNB 312 is configured to determine whether a local connection is possible between the ng-eNB 312 and the gNB 316. This determination can take place at any point prior to establishing the Xn-U communication link between the ng-eNB 312 and the gNB 316. In some examples, the determination includes the ng-eNB 312 sending a neighbor solicitation message to the gNB 316. If the secondary base station sends a neighbor advertisement message back to the ng-eNB 312, then it is determined that a local connection is possible between the ng-eNB 312 and the gNB 316. However, if no neighbor advertisement message is received from the gNB 316, then it is determined that a local connection is not possible between the ng-eNB 312 and the gNB 316.

When a new UE 108 that supports multiple Tx/Rx connects to the ng-eNB 312, the ng-eNB 312 and the gNB 316 can be used to provide resources to the new UE 108. Upon receiving measurements from the new UE 108, the ng-eNB 312 sends a request to the gNB 316 for an address suitable for establishing an Xn-U communication link between the ng-eNB 312 and the gNB 316 using the Xn-C IPsec tunnel between the baseband controller 315 of the ng-eNB 312 and the SeGW 110 and the Xn-C IPsec tunnel between the SeGW 110 and the CU-CP 326 of the gNB 316. In some examples, the request is included as part of an addition request message to the gNB 316. If a local connection between the ng-eNB 312 and the gNB 316 is possible, then the ng-eNB 312 includes a local IP address for the baseband controller 315 of the ng-eNB 312 in the request message. If a local connection between the ng-eNB 312 and the gNB 316 is not possible, then the ng-eNB 312 includes a TIA for the baseband controller 315 of the ng-eNB 312 in the request message.

Upon receipt of the addition request from the ng-eNB 312, the gNB 316 is configured to determine whether to include a local IP address in a response to the request message from the ng-eNB 312. In some examples, the gNB 316 checks the request message to determine if a local IP address of the baseband controller 315 of the ng-eNB 312 is included in the request message. If a local IP address of the baseband controller 315 of the ng-eNB 312 is included in the response message, then the gNB 316 includes a local IP address for the CU-UP instance 327 of the gNB 316 in the request message. If a local IP address of the baseband controller 315 of the ng-eNB 312 is not included in the response message (for example, the TIA of the baseband controller 315 of the ng-eNB 312 is included), then the gNB 316 includes a TIA for the CU-UP instances 327 of the gNB 316 in the response to the request message. If a local IP address of the baseband controller 315 of the ng-eNB 312 is not included in the response message (for example, the TIA of the baseband controller 315 of the ng-eNB 312 is included), then the gNB 316 includes a TIA for the CU-UP instance 327 of the gNB 316 in the response to the request message.

The gNB 316 is configured to provide the local IP address or the TIA of the CU-UP instance 327 selected to host the new UE's Protocol Data Unit (PDU) session. The CU-UP instance 327 can be selected, for example, using load balancing policies in the gNB 316.

When the request message from the ng-eNB 312 includes a local IP address for the baseband controller 315 and the response from the gNB 316 includes a local IP address for the CU-UP instance 327, the ng-eNB 312 is configured to establish a local communication link 321 for Xn-U communications using the local IP addresses and without using the SeGW 310. In the example shown in FIG. 3, the network used to implement the fronthaul network 122 (for example, a switched Ethernet network) is also used to provide the local communication link 321 between the baseband controller 315 and the CU-UP instance 327. In other examples, the local communication link 321 between the baseband controller 315 and the CU-UP instance 327 is provided in a different manner. For example, the local communication link 321 could be provided by a physical or "virtual" link or network used for fronthaul, midhaul, backhaul, or other purposes (for example, used solely for management plane communications or communications with a RAN Intelligent Controller (RIC)). A "virtual" link or network could be provided in a virtualization environment used to implement the ng-eNB 312 and the gNB 316.

In some examples, the local IP addresses of the baseband controller 315 and the CU-UP instance 327 are standard IP addresses. In some examples, the local IP addresses of the baseband controller 315 and the CU-UP instance 327 are link-local IP addresses (for example, when the baseband controller 315 and the CU-UP instance 327 are placed across switches). In some examples, the local IP addresses of the baseband controller 315 and the CU-UP instance 327 are routable IP addresses (for example, when the baseband controller 215 and the CU-UP instance 227 are placed across routers). In such examples, the local IP addresses are IPv4 addresses or IPV6 addresses.

When the request message from the ng-eNB 312 includes the TIA for the baseband controller 315 and the response from the gNB 316 includes the TIA for the CU-UP instance 327, the ng-eNB 312 is configured to establish a communication link for Xn-U communications using the TIAs and using the SeGW 310.

Figure 4:
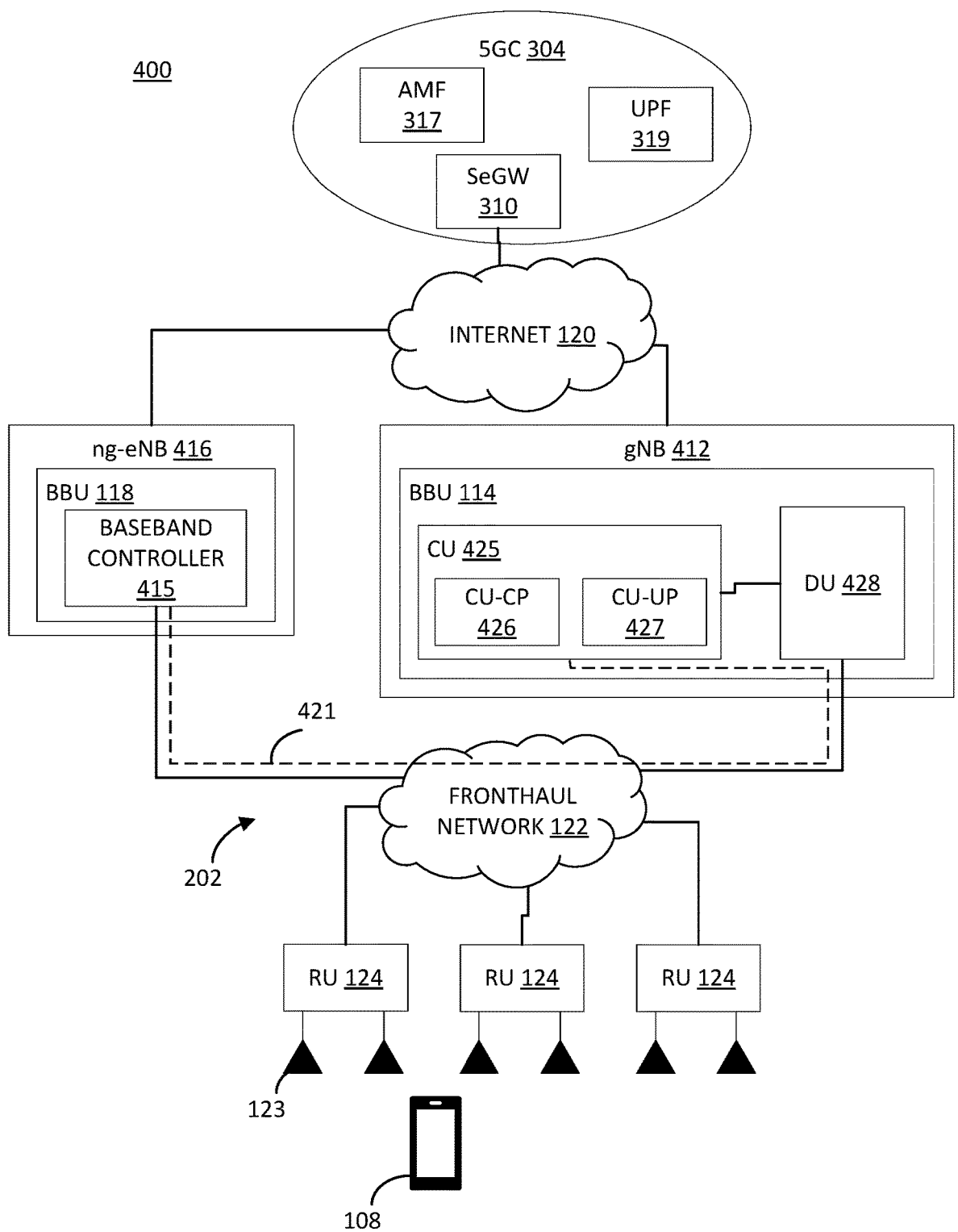

FIG. 4 is a block diagram of one exemplary embodiment of a wireless system 400 in which the automatic Xn-U link selection techniques described herein can be used. FIG. 4 is a specific example of the system shown in FIG. 1. The same numerals from FIG. 1 are used for like features in FIG. 4 and similar numerals compared to those used in FIG. 1 are used for features that are modified for the specific example shown in FIG. 4.

In the example shown in FIG. 4, the wireless system 400 comprises a radio access network (RAN) 402 and a core network 304. In this example, the RAN 402 is implemented as a Next Generation Radio Access Network (NG-RAN) providing wireless service using 4G LTE and 5G NR air interfaces. LTE and 5G NR are standards developed by the 3GPP standards organization.

The NG-RAN comprises a set of base stations 412, 416 that wirelessly communicate with UEs 108 (such as smartphones) using licensed radio frequency spectrum. NG-RAN 402 supports Multi-Radio Dual Connectivity (MR-DC) via NR-E-UTRA Dual Connectivity (NE-DC). For NE-DC, a UE 108 is connected to a 5G NR base station 412 (also generally referred to as a "gNodeB" or "gNB") and 4G LTE base station 416 (also generally referred to as an "eNodeB" or "eNB"). The gNB 416 provides 5G NR user-plane and control-plane protocol terminations towards the UE 108 and acts as the master base station (or Master Node (MN)) in NE-DC. The eNB 416 provides the E-UTRA user-plane and control-plane protocol terminations toward the UE 108 and acts as the secondary base station 116 (or Secondary Node (SN)) in NE-DC. The eNB 416 is also referred to as an "ng-eNB 416" in this example.

In the example shown in FIG. 4, the RAN 402 comprises at least one gNB 412 and at least one ng-eNB 416 that are used to provide UEs 108 with mobile access to the wireless network operator's core network 304 in order to enable the user equipment 108 to wirelessly communicate data and voice. In this example, the gNB 412 and ng-eNB 416 are configured to operate in SA mode.

In the example shown in FIG. 4, the core network 304 is implemented as a 5G Core (5GC) comprising standard 5GC network elements such as, for example, an Access and Mobility Function (AMF) 317, a User Plane Function (UPF) 319, and a Security Gateway (SeGW) 310.

In the example shown in FIG. 4, the backhaul between the RAN 402 and the 5GC 304 is implemented using one or more IP networks (including, in this example, the Internet 120).

In this example, the gNB 412 communicates with the AMF 317 and UPF 319 in the 5GC 304 using the NG interface and communicates with other base stations 412 and the ng-eNB 416 using the Xn interface. In some examples, the ng-NB 416 communicates with the UPF 319 in the 5GC 304 using the NG-U interface and communicates with the gNB 412 using the Xn interface.

The gNB 412 is implemented using one or more BBU entities 114 and one or more RUs 124 located remotely from the one or more BBU entities 114. These components implement the various base station functions necessary to implement the 5G NR air-interface and to interact with the 5GC 304. For the gNB 412, the BBU entity 114 is implemented by one or more central unit (CU) entities 425 that implement Layer-3 and non-time critical Layer-2 functions for the gNB 412 and one or more distributed units (DUs) 428 that implement the time critical Layer-2 functions and at least some of the Layer-1 (also referred to as the Physical Layer) functions for the gNB 412. Each CU 425 can be further partitioned into one or more user-plane and control-plane entities that handle the user-plane and control-plane processing of the CU, respectively. Each such user-plane CU entity is also referred to as a "CU-UP 427," and each such control-plane CU entity is also referred to as a "CU-CP 426." In this example, each RU 124 is configured to implement the radio frequency (RF) interface and the physical layer functions for the associated base station that are not implemented in the DU 428.

The ng-eNB 416 is implemented using one or more BBU entities 118 and one or more RUs 124 located remotely from the one or more BBU entities 118. These components implement the various base station functions necessary to implement the 4G LTE air-interface and to interact with the 5GC 304. For the ng-eNB 416, the BBU entity 118 is implemented by a central unit (also referred to as a "baseband controller") 415 that performs Layer-3, Layer-2, and some Layer-1 processing for the cell. The multiple RUs 124 are typically located remotely from each other (that is, the multiple RUs are not co-located) are communicatively coupled to the baseband controller 415 over a fronthaul network 122. In some examples, the fronthaul network 122 is a switched Ethernet fronthaul network (for example, a switched Ethernet network that supports the Internet Protocol (IP)).

In the example shown in FIG. 4, the gNB 412 and the ng-eNB 416 include or are coupled to one or more antennas 123 via which downstream radio frequency signals are radiated to user equipment 108 and via which upstream radio frequency signals transmitted by user equipment 108 are received. In the example shown in FIG. 4, the gNB 412 and the ng-eNB 416 are implemented using the same RUs 124 and antennas 123. That is, the gNB 412 and the ng-eNB 416 share RUs 124 and antennas 123. In other examples, the gNB 412 is implemented using respective RUs 124 and antennas 123 that are different than the RUs 124 and antennas 123 used to implement the ng-eNB 416.

In the example showing FIG. 4, only one gNB 412 and only one ng-eNB 416 are shown. It should be understood that a different number of 5G NR base stations 412 and/or 4G LTE base stations 416 could be used to implement the RAN 402.

During commissioning or deployment of a ng-eNB 416, an association between the gNB 412 and the ng-eNB 416 can be established. Such an association can be established using a service management and orchestration (SMO) entity (for example, an Operations and Maintenance (OAM) entity or a Device Management System (DMS)). The CU-CP 426 of the gNB 412 is configured to provide a bearer-tunnel inner address (TIA) to the SMO entity, and the SMO entity provides the bearer-TIA to the baseband controller 415 of the ng-eNB 416. In some examples, the communications with the SMO entity occur via respective IPsec tunnels between the SeGW 410 and the gNB 412 and the ng-eNB 416.

Using the IPsec tunnel between the baseband controller 415 of the ng-eNB 416 and the SeGW 410 and the IPsec tunnel between the SeGW 410 and the CU-CP 426 of the gNB 412, the baseband controller 415 of the ng-eNB 416 sends an Xn-C setup request to the CU-CP 426 of the gNB 412. Using the IPsec tunnels, the CU-CP 426 of the gNB 412 sends an Xn-C setup response to the baseband controller 415 of the ng-eNB 416.

The gNB 412 can also use the SeGW 410 to transmit Xn-U communications with the ng-eNB 416. However, as discussed above, using the SeGW 410 is not ideal since doing so can introduce latency and decreases throughput for user plane data. The gNB 412 is configured to determine whether a local connection is possible between the gNB 412 and the ng-eNB 416. This determination can take place at any point prior to establishing the Xn-U communication link between the gNB 412 and the ng-eNB 416. In some examples, the determination includes the gNB 412 sending a neighbor solicitation message to the ng-eNB 416. If the secondary base station sends a neighbor advertisement message back to the gNB 412, then it is determined that a local connection is possible between the gNB 412 and the ng-eNB 416. However, if no neighbor advertisement message is received from the ng-eNB 416, then it is determined that a local connection is not possible between the gNB 412 and the ng-eNB 416.

When a new UE 108 that supports multiple Tx/Rx connects to the gNB 412, the gNB 412 and the ng-eNB 416 can be used to provide resources to the new UE 108. Upon receiving measurements from the new UE 108, the gNB 412 is configured to select a CU-UP instance 427 to host the new UE's Protocol Data Unit (PDU) session (for example, using load balancing policies in the gNB 412). The gNB 412 also sends a request to the ng-eNB 416 for an address suitable for establishing an Xn-U communication link between the gNB 412 and the ng-eNB 416 using the Xn-C IPsec tunnel between the CU-CP 426 of the gNB 412 and the SeGW 410 and the Xn-C IPsec tunnel between the SeGW 410 and the baseband controller 415 of the ng-eNB 416. In some examples, the request is included as part of an addition request message to the ng-eNB 416. If a local connection between the gNB 412 and the ng-eNB 416 is possible, then the gNB 412 includes a local IP address for the CU-UP instance 427 of the gNB 412 in the request message. If a local connection between the gNB 412 and the ng-eNB 416 is not possible, then the gNB 412 includes a TIA for the CU-UP instance 427 of the gNB 412 in the request message.

Upon receipt of the addition request from the gNB 412, the ng-eNB 416 is configured to determine whether to include a local IP address in a response to the request message from the gNB 412. In some examples, the ng-eNB 416 checks the request message to determine if a local IP address of the CU-UP instance 427 of the gNB 412 is included in the request message. If a local IP address of the CU-UP instance 427 of the gNB 412 is included in the response message, then the ng-eNB 416 includes a local IP address for the baseband controller 415 of the ng-eNB 416 in the request message. If a local IP address of the CU-UP instance 427 of the gNB 412 is not included in the response message (for example, the TIA of the CU-UP instance 427 of the gNB 412 is included), then the ng-eNB 416 includes a TIA for the baseband controller 415 of the ng-eNB 416 in the response to the request message.

When the request message from the gNB 412 includes a local IP address for the CU-UP instance 427 and the response from the ng-eNB 416 includes a local IP address for the baseband controller 415, the gNB 412 is configured to establish a local communication link 421 for Xn-U communications using the local IP addresses and without using the SeGW 410. In the example shown in FIG. 4, the network used to implement the fronthaul network 122 (for example, a switched Ethernet network) is also used to provide the local communication link 421 between the CU-UP instance 427 and the baseband controller 415. In other examples, the local communication link 421 between the CU-UP instance 427 and the baseband controller 415 is provided in a different manner. For example, the local communication link 421 could be provided by a physical or "virtual" link or network used for fronthaul, midhaul, backhaul, or other purposes (for example, used solely for management plane communications or communications with a RAN Intelligent Controller (RIC)). A "virtual" link or network could be provided in a virtualization environment used to implement the gNB 412 and the ng-eNB 416.

In some examples, the local IP addresses of the CU-UP instance 427 and the baseband controller 415 are standard IP addresses. In some examples, the local IP addresses of the CU-UP instance 427 and the baseband controller 415 are link-local IP addresses (for example, when the CU-UP instance 427 and the baseband controller 415 are placed across switches). In some examples, the local IP addresses of the CU-UP instance 427 and the baseband controller 415 are routable IP addresses (for example, when the CU-UP instance 427 and the baseband controller 415 are placed across routers). In such examples, the local IP addresses are IPv4 addresses or IPv6 addresses.

When the request message from the gNB 412 includes the TIA for the CU-UP instance 427 and the response from the ng-eNB 416 includes the TIA for the baseband controller 415, the gNB 412 is configured to establish a communication link for Xn-U communications using the TIAs and using the SeGW 410.

Figure 5:
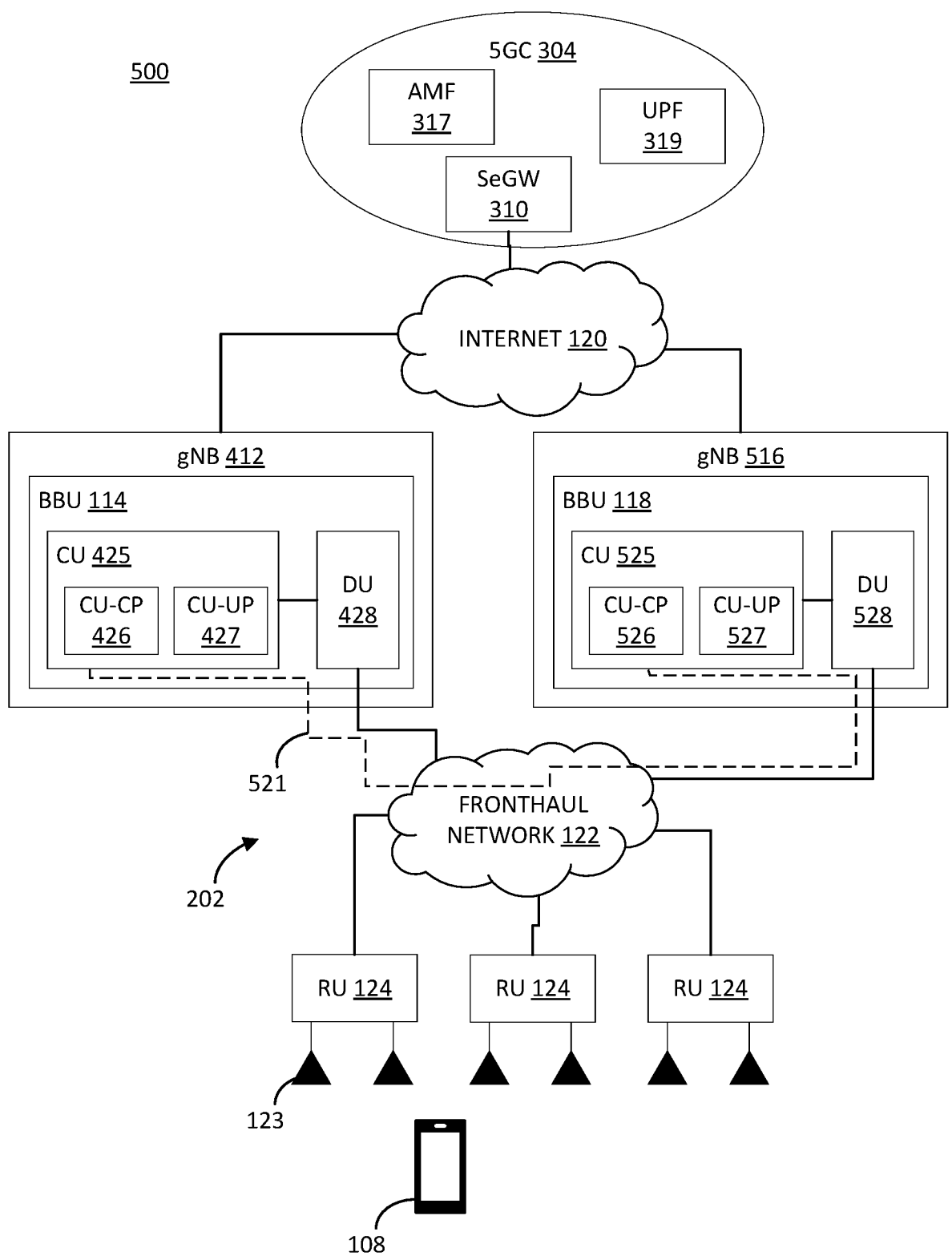

FIG. 5 is a block diagram of one exemplary embodiment of a wireless system 500 in which the automatic Xn-U link selection techniques described herein can be used. FIG. 5 is a specific example of the system shown in FIG. 1. The same numerals from FIG. 1 are used for like features in FIG. 5 and similar numerals compared to those used in FIG. 1 are used for features that are modified for the specific example shown in FIG. 5.

In the example shown in FIG. 5, the wireless system 500 comprises a radio access network (RAN) 502 and a core network 304. In this example, the RAN 502 is implemented as a Next Generation Radio Access Network (NG-RAN) providing wireless service using 5G NR air interfaces. 5G NR is a standard developed by the 3GPP standards organization.

The NG-RAN comprises a set of base stations 412, 516 that wirelessly communicate with UEs 108 (such as smartphones) using licensed radio frequency spectrum. NG-RAN 502 supports Multi-Radio Dual Connectivity (MR-DC) via NR-NR Dual Connectivity (NR-DC). For NR-DC, a UE 108 is connected to two 5G NR base stations 412, 516 (also generally referred to as a "gNodeB" or "gNB"). The gNB 416 provides 5g NR user-plane and control-plane protocol terminations towards the UE 108 and acts as the master base station (or Master Node (MN)) in NR-DC. The gNB 516 provides the 5G NR user-plane and control-plane protocol terminations toward the UE and acts as the secondary base station 116 (or Secondary Node (SN)) in NR-DC.

In the example shown in FIG. 5, the RAN 502 comprises at least one gNB 412 and at least one gNB 516 that are used to provide UEs 108 with mobile access to the wireless network operator's core network 304 in order to enable the user equipment 108 to wirelessly communicate data and voice. In this example, the gNB 412 and gNB 516 are configured to operate in SA mode.

In the example shown in FIG. 5, the core network 304 is implemented as a 5G Core (5GC) comprising standard 5GC network elements such as, for example, an Access and Mobility Function (AMF) 317, a User Plane Function (UPF) 319, and a Security Gateway (SeGW) 310.

In the example shown in FIG. 5, the backhaul between the RAN 502 and the 5GC 304 is implemented using one or more IP networks (including, in this example, the Internet 120).

In this example, the gNB 412 communicates with the AMF 317 and UPF 319 in the 5GC 304 using the NG interface and communicates with other base stations and the gNB 516 using the Xn interface. In some examples, the gNB 516 communicates with the UPF 319 in the 5GC 304 using the NG-U interface and communicates with the gNB 412 using the Xn interface.

The gNB 412 is implemented using one or more BBU entities 114 and one or more RUs 124 located remotely from the one or more BBU entities 114. These components implement the various base station functions necessary to implement the 5G NR air-interface and to interact with the 5GC 304. For the gNB 412, the BBU entity 114 is implemented by one or more central unit (CU) entities 425 that implement Layer-3 and non-time critical Layer-2 functions for the gNB 412 and one or more distributed units (DUs) 428 that implement the time critical Layer-2 functions and at least some of the Layer-1 (also referred to as the Physical Layer) functions for the gNB 412. Each CU 425 can be further partitioned into one or more user-plane and control-plane entities that handle the user-plane and control-plane processing of the CU, respectively. Each such user-plane CU entity is also referred to as a "CU-UP 427," and each such control-plane CU entity is also referred to as a "CU-CP 426." In this example, each RU 124 is configured to implement the radio frequency (RF) interface and the physical layer functions for the associated base station that are not implemented in the DU 428.

The gNB 516 is implemented using one or more BBU entities 118 and one or more RUs 124 located remotely from the one or more BBU entities 118. These components implement the various base station functions necessary to implement the 5G NR air-interface and to interact with the 5GC 304. For the gNB 516, the BBU entity 118 is implemented by one or more central unit (CU) entities 525 that implement Layer-3 and non-time critical Layer-2 functions for the gNB 516 and one or more distributed units (DUs) 528 that implement the time critical Layer-2 functions and at least some of the Layer-1 (also referred to as the Physical Layer) functions for the gNB 516. Each CU 525 can be further partitioned into one or more user-plane and control-plane entities that handle the user-plane and control-plane processing of the CU, respectively. Each such user-plane CU entity is also referred to as a "CU-UP 527," and each such control-plane CU entity is also referred to as a "CU-CP 526." In this example, each RU 124 is configured to implement the radio frequency (RF) interface and the physical layer functions for the associated base station that are not implemented in the DU 528.

In the example shown in FIG. 5, the gNB 412 and the gNB 516 include or are coupled to one or more antennas 123 via which downstream radio frequency signals are radiated to UEs 108 and via which upstream radio frequency signals transmitted by UEs 108 are received. In the example shown in FIG. 5, the gNB 412 and the gNB 516 are implemented using the same RUs 124 and antennas 123. That is, the gNB 412 and the gNB 516 share RUs 124 and antennas 123. In other examples, the gNB 412 is implemented using respective RUs 124 and antennas 123 that are different than the RUs 124 and antennas 123 used to implement the gNB 516. In some such examples, the gNB 412 RUs and the gNB 516 RUs are configured to provide 5G NR radio access in the same frequency range. In other such examples, the gNB 412 RUs are configured to provide 5G NR radio access in frequency range 1 or frequency range 2 and the gNB 516 RUs are configured to provide 5G NR radio access in frequency range 2 or frequency range 1, respectively.

In the example showing FIG. 5, two gNBs 412, 516 are shown. It should be understood that a different number of 5G NR base stations 412, 516 could be used to implement the RAN 502.

During commissioning or deployment of a gNB 516, an association between the gNB 412 and the gNB 516 can be established. Such an association can be established using a service management and orchestration (SMO) entity (for example, an Operations and Maintenance (OAM) entity or a Device Management System (DMS)). The CU-CP 426 of the gNB 412 is configured to provide a bearer-tunnel inner address (TIA) to the SMO entity, and the SMO entity provides the bearer-TIA to the CU-CP 526 of the gNB 516. In some examples, the communications with the SMO entity occur via respective IPsec tunnels between the SeGW 410 and the gNBs 412, 516.

Using the IPsec tunnel between the CU-CP 526 of the gNB 516 and the SeGW 410 and the IPsec tunnel between the SeGW 410 and the CU-CP 426 of the gNB 412, the CU-CP 526 of the gNB 516 sends an Xn-C setup request to the CU-CP 426 of the gNB 412. Using the IPsec tunnels, the CU-CP 426 of the gNB 412 sends an Xn-C setup response (for example, where the core network 104 is a 5GC) to the CU-CP 526 of the gNB 516.

The gNB 412 can also use the SeGW 410 to transmit Xn-U communications with the gNB 516. However, as discussed above, using the SeGW 410 is not ideal since doing so can introduce latency and decreases throughput for user plane data. The gNB 412 is configured to determine whether a local connection is possible between the gNB 412 and the gNB 516. This determination can take place at any point prior to establishing the Xn-U communication link between the gNB 412 and the gNB 516. In some examples, the determination includes the gNB 412 sending a neighbor solicitation message to the gNB 516. If the secondary base station sends a neighbor advertisement message back to the gNB 412, then it is determined that a local connection is possible between the gNB 412 and the gNB 516. However, if no neighbor advertisement message is received from the gNB 516, then it is determined that a local connection is not possible between the gNB 412 and the gNB 516.

When a new UE 108 that supports multiple Tx/Rx connects to the gNB 412, the gNB 412 and the gNB 516 can be used to provide resources to the new UE 108. Upon receiving measurements from the new UE 108, the gNB 412 is configured to select a CU-UP instance 427 to host the new UE's Protocol Data Unit (PDU) session (for example, using load balancing policies in the gNB 412). The gNB 412 also sends a request to the gNB 516 for an address suitable for establishing an Xn-U communication link between the gNB 412 and the gNB 516 using the Xn-C IPsec tunnel between the CU-CP 426 of the gNB 412 and the SeGW 410 and the Xn-C IPsec tunnel between the SeGW 410 and the CU-CP 526 of the gNB 516. In some examples, the request is included as part of an addition request message to the gNB 516. If a local connection between the gNB 412 and the gNB 516 is possible, then the gNB 412 includes a local IP address for the CU-UP instance 427 of the gNB 412 in the request message. If a local connection between the gNB 412 and the gNB 516 is not possible, then the gNB 412 includes a TIA for the CU-UP instance 427 of the gNB 412 in the request message.

Upon receipt of the addition request from the gNB 412, the gNB 516 is configured to determine whether to include a local IP address in a response to the request message from the gNB 412. In some examples, the gNB 516 checks the request message to determine if a local IP address of the CU-UP instance 427 of the gNB 412 is included in the request message. If a local IP address of the CU-UP instance 427 of the gNB 412 is included in the response message, then the gNB 516 includes a local IP address for the CU-UP instance 527 of the gNB 516 in the request message. If a local IP address of the CU-UP instance 427 of the gNB 412 is not included in the response message (for example, the TIA of the CU-UP instance 427 of the gNB 412 is included), then the gNB 516 includes a TIA for the CU-UP instance 527 of the gNB 516 in the response to the request message.

The gNB 516 is configured to provide the local IP address or the TIA of the CU-UP instance 527 selected to host the new UE's Protocol Data Unit (PDU) session. The CU-UP instance 527 can be selected, for example, using load balancing policies in the gNB 516.

When the request message from the gNB 412 includes a local IP address for the CU-UP instance 427 and the response from the gNB 516 includes a local IP address for the CU-UP instance 527, the gNB 412 is configured to establish a local communication link 521 for Xn-U communications using the local IP addresses and without using the SeGW 410. In the example shown in FIG. 5, the network used to implement the fronthaul network 122 (for example, a switched Ethernet network) is also used to provide the local communication link 521 between the CU-UP instance 427 and the CU-UP instance 527. In other examples, the local communication link 521 between the CU-UP instance 427 and the CU-UP instance 527 is provided in a different manner. For example, the local communication link 521 could be provided by a physical or "virtual" link or network used for fronthaul, midhaul, backhaul, or other purposes (for example, used solely for management plane communications or communications with a RAN Intelligent Controller (RIC)). A "virtual" link or network could be provided in a virtualization environment used to implement the gNB 412 and the gNB 516.

In some examples, the local IP addresses of the CU-UP instance 427 and the CU-UP instance 527 are standard IP addresses. In some examples, the local IP addresses of the CU-UP instance 427 and the CU-UP instance 527 are link-local IP addresses (for example, when the CU-UP instance 427 and the CU-UP instance 527 are placed across switches). In some examples, the local IP addresses of the CU-UP instance 427 and the CU-UP instance 527 are routable IP addresses (for example, when the CU-UP instance 427 and the CU-UP instance 527 are placed across routers). In such examples, the local IP addresses are IPv4 addresses or IPv6 addresses.

When the request message from the gNB 412 includes the TIA for the CU-UP instance 427 and the response from the gNB 516 includes the TIA for the CU-UP instance 527, the gNB 412 is configured to establish a local communication link for Xn-U communications using the TIAs and using the SeGW 410.

The base stations that include the components shown in FIGS. 1-5 can be implemented using a scalable cloud environment in which resources used to instantiate each type of entity can be scaled horizontally (that is, by increasing or decreasing the number of physical computers or other physical devices) and vertically (that is, by increasing or decreasing the "power" (for example, by increasing the amount of processing and/or memory resources) of a given physical computer or other physical device). The scalable cloud environment can be implemented in various ways. For example, the scalable cloud environment can be implemented using hardware virtualization, operating system virtualization, and application virtualization (also referred to as containerization) as well as various combinations of two or more of the preceding. The scalable cloud environment can be implemented in other ways. In some examples, the scalable cloud environment is implemented in a distributed manner. That is, the scalable cloud environment is implemented as a distributed scalable cloud environment comprising at least one central cloud, at least one edge cloud, and at least one radio cloud.

In some examples, one or more components of the one or more BBU entities 114, 118 (for example, the CU, CU-CP, CU-UP, and/or DU) are implemented as a software virtualized entities that are executed in a scalable cloud environment on a cloud worker node under the control of the cloud native software executing on that cloud worker node. In some such examples, the DU is communicatively coupled to at least one CU-CP and at least one CU-UP, which can also be implemented as software virtualized entities. In some other examples, one or more components of the one or more BBU entities 114, 118 (for example, the CU-CP, CU-UP, and/or DU) are implemented as a single virtualized entity executing on a single cloud worker node. In some examples, the at least one CU-CP and the at least one CU-UP can each be implemented as a single virtualized entity executing on the same cloud worker node or as a single virtualized entity executing on a different cloud worker node. However, it is to be understood that different configurations and examples can be implemented in other ways. For example, the CU can be implemented using multiple CU-UP VNFs and using multiple virtualized entities executing on one or more cloud worker nodes. Moreover, it is to be understood that the CU and DU can be implemented in the same cloud (for example, together in a radio cloud or in an edge cloud). In some examples, the DU is configured to be coupled to the CU-CP and CU-UP over a midhaul network (for example, a network that supports the Internet Protocol (IP)). Other configurations and examples can be implemented in other ways.

Figure 6:
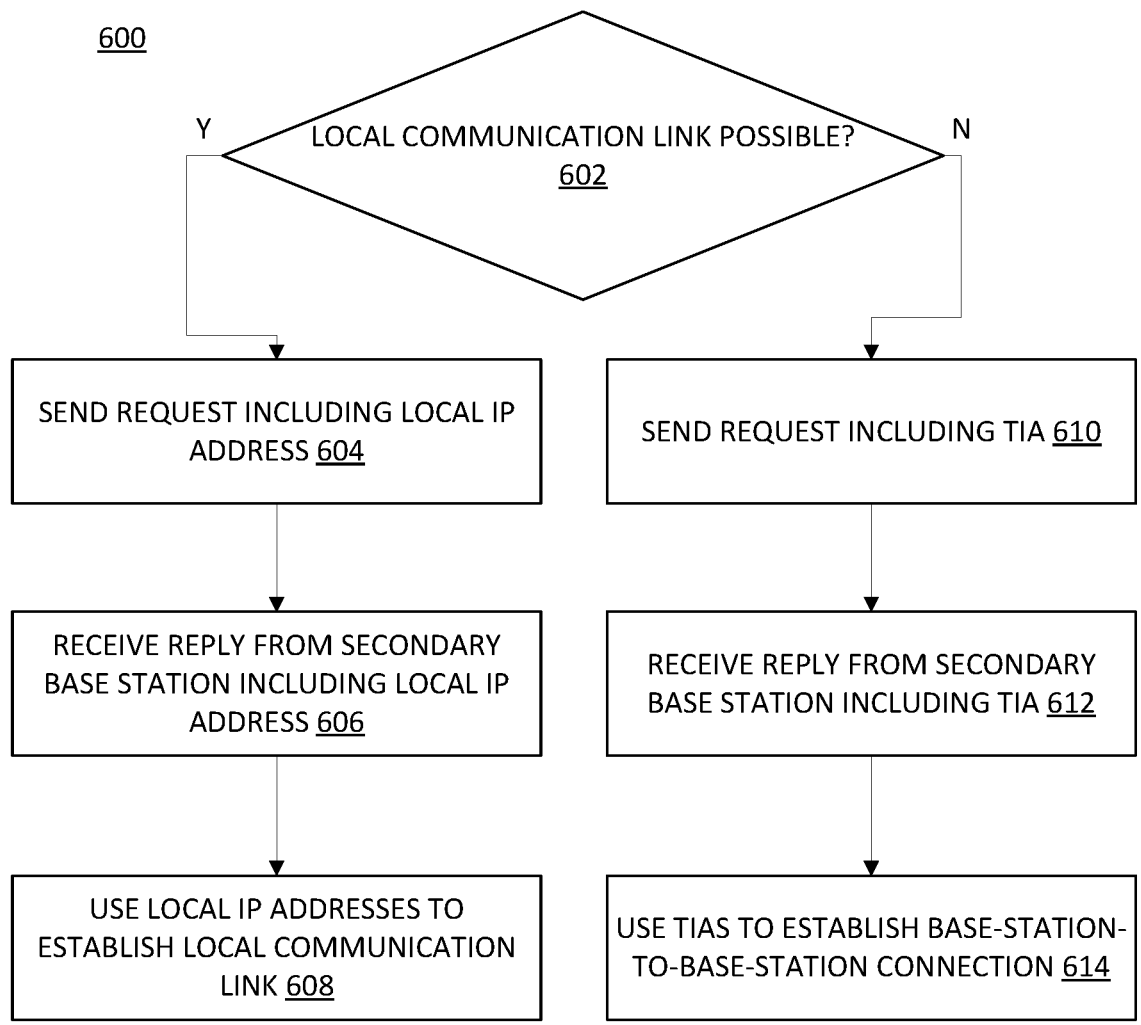
FIG. 6 is a flow diagram illustrating an example method of discovering an address for an X2-U/Xn-U interface.

FIG. 6 is a flow diagram illustrating an example method 600 of discovering an address for an X2-U/Xn-U interface.

The example method 600 shown in FIG. 6 is described herein as being implemented using the system 100 shown in FIG. 1. However, it is to be understood that the generic description also applies to the more specific systems shown in FIGS. 2-5. It is to be understood that other embodiments can be implemented in other ways.

The blocks of the sequence diagram shown in FIG. 6 have been arranged in a generally sequential manner for ease of explanation; however, it is to be understood that this arrangement is merely exemplary, and it should be recognized that the processing associated with method 600 (and the blocks shown in FIG. 6) can occur in a different order (for example, where at least some of the processing associated with the blocks is performed in parallel and/or in an event-driven manner).

Method 600 is performed by a master base station (or Master Node (MN)) configured to implement MR-DC service with a secondary base station (or Secondary Node (SN)) as discussed above. Method 600 is used by the master base station to send a request to a secondary base station for an address suitable for establishing a communication link between the master base station and the secondary base station. In this example, the communication link is a X2-U or Xn-U interface.

Method 600 can be used by the master base station to request an address from the secondary base station that is either a local IP address suitable for establishing a local X2-U or Xn-U communication link or a TIA suitable for establishing a X2-U or Xn-U communication link over one or more IPsec connections.

The master base station can detect a secondary base station using, for example, a neighbor solicitation procedure. The neighbor solicitation procedure does not provide a suitable address to establish an X2-U or Xn-U interface between the master base station and the secondary base station.

The method 600 begins with determining whether a local communication link between the master base station and the secondary base station is possible (block 602). In some examples, determining whether a local communication link between the master base station and a secondary base station is possible includes sending a neighbor solicitation message to the secondary base station.

If a local communication link between the master base station and the secondary base station is possible, then method 600 proceeds with sending a request to the secondary base station for an address suitable for establishing a communication link between the master base station and the secondary base station (block 604). In this situation, the request to the secondary base station includes a local IP address for a BBU entity of the master base station. The request can be, for example, an addition request message that is sent via one or more IPsec connections.

The secondary base station receives the address request that includes the local IP address for a BBU entity of the master base station. In response to this request, the secondary base station sends a reply to the address request. When the address request includes the local IP address for a BBU entity of the master base station, the reply will include a local IP address for a BBU entity of the secondary base station. The reply can be, for example, an addition request acknowledge message that is sent via one or more IPsec connections.

When the master base station receives the reply to the address request that includes the local IP address for a BBU entity of the secondary base station (block 606), the master base station uses the local IP addresses for the BBU entities to establish a local communication link without using a Security Gateway in the core network (block 608).

If a local communication link between the master base station and the secondary base station is not possible, then method 600 proceeds with sending a request to the secondary base station for an address suitable for establishing a communication link between the master base station and the secondary base station (block 610). In this situation, the request to the secondary base station that includes TIA for a BBU entity of the master base station. The request can be, for example, an addition request message that is sent via one or more IPsec connections.

The secondary base station receives the address request that includes the TIA for a BBU entity of the master base station. In response to this request, the secondary base station sends a reply to the address request. When the address request includes the TIA for a BBU entity of the master base station, the reply will include a TIA for a BBU entity of the secondary base station. The reply can be, for example, an addition request acknowledge message that is sent via one or more IPsec connections.

When the master base station receives the reply to the address request that includes the TIA for a BBU entity of the secondary base station (block 612), the master base station uses the TIAs for the BBU entities to base-station-to-base-station connection using a Security Gateway in the core network (block 614).

Figure 7:
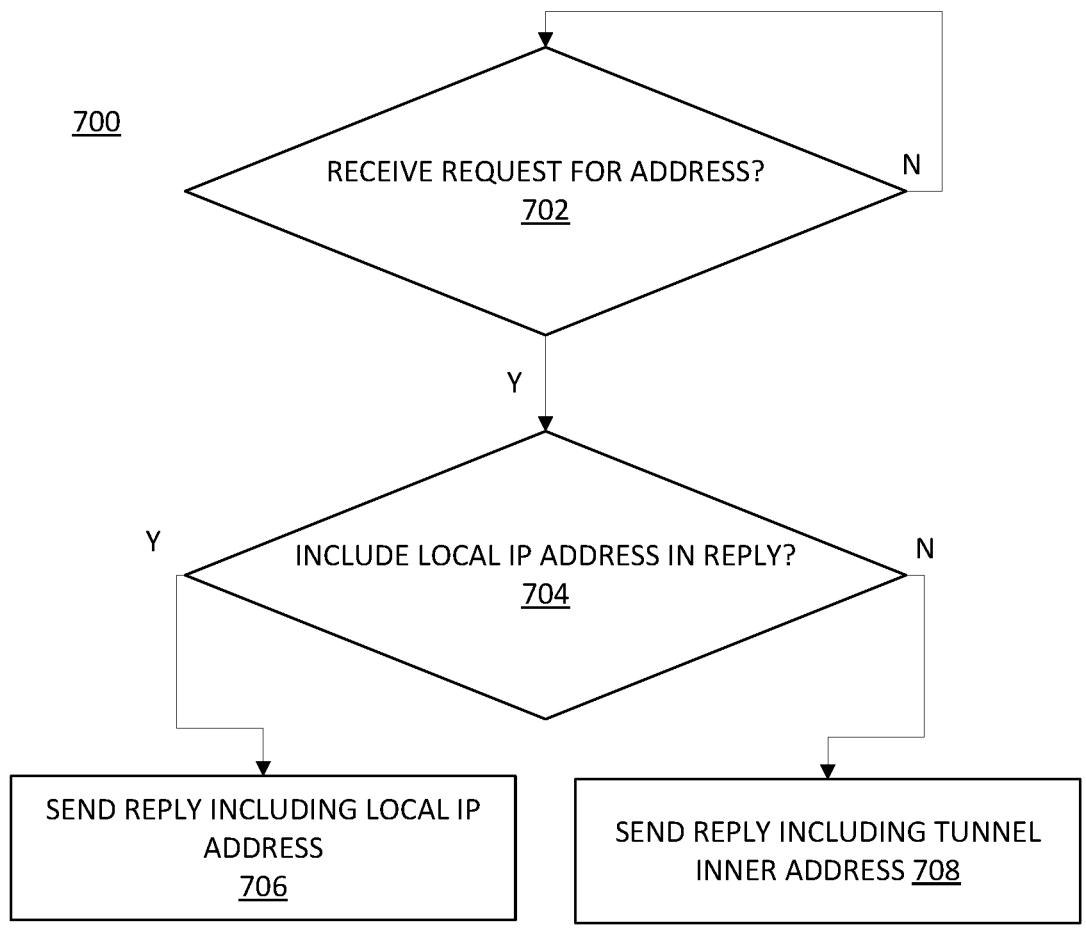
FIG. 7 is a flow diagram illustrating an example method of discovering an address for an X2-U/Xn-U interface.

FIG. 7 is a flow diagram illustrating an example method 700 of discovering an address for an X2-U/Xn-U interface.

The example method 700 shown in FIG. 7 is described herein as being implemented using the system 100 shown in FIG. 1. However, it is to be understood that the generic description also applies to the more specific systems shown in FIGS. 2-5. It is to be understood that other embodiments can be implemented in other ways.

The blocks of the sequence diagram shown in FIG. 7 have been arranged in a generally sequential manner for ease of explanation; however, it is to be understood that this arrangement is merely exemplary, and it should be recognized that the processing associated with method 700 (and the blocks shown in FIG. 7) can occur in a different order (for example, where at least some of the processing associated with the blocks is performed in parallel and/or in an event-driven manner).

Method 700 is performed by a secondary base station (or Secondary Node (SN)) configured to implement MR-DC service with a master base station (or Master Node (MN)) as discussed above. Method 700 is used by the secondary base station to reply to a request to from a master base station for an address suitable for establishing communication link between the master base station and the secondary base station. In this example, the communication link is a X2-U or Xn-U interface.

The secondary base station receives an address request from a master base station (block 702). The request can be, for example, an addition request message that is sent via one or more IPsec connections. The request can include a local IP address of a BBU entity of the master base station or a TIA of the BBU entity of the master base station.

In response, the secondary base station determines whether to include a local IP address for a BBU entity of the secondary base station in the reply (block 704). In some examples, determining whether to include a local IP address for a BBU entity of the secondary base station in the reply includes checking the request to determine if a local IP address for a BBU entity of the master base station is included in the request.

If the secondary base station determines that a local IP address for a BBU entity of the secondary base station should be included in the reply (for example, if the request included a local IP address for a BBU, then method 700 proceeds with sending a reply to the master base station that includes the local IP address for a BBU entity of the secondary base station (block 706). The reply can be, for example, an addition request acknowledge message that is sent via one or more IPsec connections. In this situation, the master base station uses the local IP addresses for the BBU entities to establish a local communication link without using a Security Gateway in the core network.

If the secondary base station determines that a local IP address for a BBU entity of the secondary base station should not be included in the reply, then method 700 proceeds with sending a reply to the master base station that includes the TIA for a BBU entity of the secondary base station (block 708). The reply can be, for example, an addition request acknowledge message that is sent via one or more IPsec connections. In this situation, the master base station uses the TIAs for the BBU entities to base-station-to-base-station connection using a Security Gateway in the core network.

The methods and techniques described here may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs).

EXAMPLE EMBODIMENTS

Example 1 includes a method, comprising: determining, by a first base station, whether a local communication link between the first base station and a second base station is possible; in response to determining that the local communication link between the first base station and the second base station is possible, sending, by the first base station, a request to the second base station for an address suitable for establishing a communication link between the first base station and the second base station, wherein the request includes a first local Internet Protocol (IP) address for a baseband unit entity of the first base station; determining, by the second base station, whether to include a second local IP address for a baseband unit entity of the second base station in a response to the request from the first base station; in response to determining to include the second local IP address for the baseband unit entity of the second base station in the response, sending, by the second base station, the response to the request to the first base station, the response to the request including the second local IP address for the baseband unit entity of the second base station; and establishing the local communication link between the first base station and the second base station using the first local IP address and the second local IP address without using a security gateway.

Example 2 includes the method of Example 1, wherein the local communication link is used to implement an X2-U interface or an Xn-U interface between the first base station and the second base station.

Example 3 includes the method of any of Examples 1-2, further comprising: in response to determining that the local communication link between the first base station and the second base station is not possible, sending, by the first base station, a tunnel inner address for the baseband unit entity of the first base station to the second base station; in response to determining not to include the second local IP address for the baseband unit entity of the second base station in the response, sending, by the second base station, the response to the request to the first base station, the response to the request including a tunnel inner address for the baseband unit of the second base station; and establishing a base-station-to-base-station connection between the first base station and the second base station using the security gateway.

Example 4 includes the method of any of Examples 1-3, wherein determining, by a first base station, whether a local communication link between the first base station and a second base station is possible comprises: sending, by the first base station, a neighbor solicitation message to the second base station; and receiving, by the first base station, a neighbor advertisement message from the second base station.

Example 5 includes the method of any of Examples 1-4, wherein determining, by the second base station, whether to include a second local IP address for a baseband unit entity of the second base station in a response to the request from the first base station comprises: checking the request to determine if the first local IP address is included in the request.

Example 6 includes the method of any of Examples 1-5, wherein the request to the second base station is sent through the security gateway via one or more IP Security (IPsec) connections, wherein the response to the request is sent through the security gateway via the one or more IPsec connections.

Example 7 includes a secondary base station, comprising: an interface to communicatively couple the secondary base station to a network; wherein the secondary base station is configured to perform at least some processing associated with implementing an air interface to provide wireless service; wherein the secondary base station is configured to respond to a request from a master base station for an address suitable for establishing a communication link between the master base station and the secondary base station by: determining whether to include a local IP address for a baseband unit entity of the secondary base station in a response to the request from the master base station; and in response to determining to include the local IP address for the baseband unit entity of the secondary base station in the response, sending the response to the request to the master base station, the response to the request including the local IP address for the baseband unit entity of the secondary base station; wherein the local IP address for the baseband unit entity of the secondary base station is used to establish a local communication link between the master base station and the secondary base station without using a security gateway.

Example 8 includes the secondary base station of Example 7, wherein the local communication link is used to implement an X2-U interface or an Xn-U interface between the master base station and the secondary base station.

Example 9 includes the secondary base station of any of Examples 7-8, wherein the secondary base station is a 5G NR base station, wherein the baseband unit entity of the secondary base station is a CU-UP.

Example 10 includes the secondary base station of any of Examples 7-9, wherein the secondary base station is a 4G LTE base station, wherein the baseband unit entity of the secondary base station is a baseband controller.

Example 11 includes the secondary base station of any of Examples 7-10, wherein the secondary base station is further configured to: in response to determining not to include the local IP address for the baseband unit entity of the secondary base station in the response, send the response to the request to the master base station, the response to the request including a tunnel inner address for the baseband unit entity of the secondary base station; wherein the tunnel inner address for the baseband unit entity of the secondary base station is used to establish a base-station-to-base-station connection between the master base station and the secondary base station using the security gateway.

Example 12 includes the secondary base station of any of Examples 7-11, wherein the local IP address for the baseband unit entity of the secondary base station is a standard IP address or a link-local IP address; and wherein the local IP address for the baseband unit entity of the secondary base station is an IPV4 address or an IPV6 address.

Example 13 includes the secondary base station of any of Examples 7-12, wherein the interface is configured to couple the secondary base station to an ETHERNET network.

Example 14 includes a master base station, comprising: an interface to communicatively couple the master base station to a network; wherein the master base station is configured to perform at least some processing associated with implementing an air interface to provide wireless service; and wherein the master base station is configured to: determine whether a local communication link between the master base station and a secondary base station is possible; in response to determining that the local communication link between the master base station and the secondary base station is possible, send a request to the secondary base station for an address suitable for establishing a local communication link between the master base station and the secondary base station, wherein the request includes a first local network Internet Protocol (IP) address for a baseband unit entity of the master base station; receive a response to the request from the secondary base station, wherein the response to the request includes a second local IP address for a baseband unit entity of the secondary base station; and establish the local communication link between the master base station and the secondary base station using the first local IP address and the second local IP address without using a security gateway.

Example 15 includes the master base station of Example 14, wherein the local communication link is used to implement an X2-U interface or an Xn-U interface between the master base station and the secondary base station.

Example 16 includes the master base station of any of Examples 14-15, wherein the master base station is a 4G LTE base station, wherein the baseband unit entity of the master base station is a baseband controller.

Example 17 includes the master base station of any of Examples 14-16, wherein the master base station is a 5G NR base station, wherein the baseband unit entity of the master base station is a CU-UP.

Example 18 includes the master base station of any of Examples 14-17, wherein the master base station is further configured to: in response to determining that the local communication link between the master base station and the secondary base station is not possible, send a tunnel inner address for the baseband unit entity of the master base station to the secondary base station; receive the response to the request from the secondary base station, the response to the request including a tunnel inner address for the baseband unit entity of the secondary base station; and establish a base-station-to-base-station connection between the master base station and the secondary base station using the security gateway, wherein the base-station-to-base-station connection between the master base station and the secondary base station is established using the tunnel inner address of the baseband unit entity of the master base station and the tunnel inner address of the baseband unit entity of the secondary base station.

Example 19 includes the master base station of any of Examples 14-18, wherein the local IP address for the baseband unit entity of the master base station is a standard IP address or a link-local IP address; and wherein the local IP address for the baseband unit entity of the master base station is an IPV4 address or an IPV6 address.

Example 20 includes the master base station of any of Examples 14-19, wherein the master base station is configured to determine whether the local communication link between the master base station and the secondary base station is possible by: sending a neighbor solicitation message to the secondary base station; and receiving a neighbor advertisement message from the secondary base station.

A number of embodiments of the invention defined by the following claims have been described. Nevertheless, it will be understood that various modifications to the described embodiments may be made without departing from the spirit and scope of the claimed invention. Accordingly, other embodiments are within the scope of the following claims.

What is claimed is:

1. A method, comprising:
   determining, by a first base station, whether a local communication link between the first base station and a second base station is possible, wherein the local communication link is used to implement an X2-U interface or an Xn-U interface between the first base station and the second base station;
   in response to determining that the local communication link between the first base station and the second base station is possible, sending, by the first base station, a request to the second base station for an address suitable for establishing a communication link between the first base station and the second base station, wherein the request includes a first local Internet Protocol (IP) address for a first baseband unit entity of the first base station;
   determining, by the second base station, whether to include a second local IP address for a second baseband unit entity of the second base station in a response to the request from the first base station;
   in response to determining to include the second local IP address for the second baseband unit entity of the second base station in the response, sending, by the second base station, the response to the request to the first base station, the response to the request including the second local IP address for the second baseband unit entity of the second base station; and
   establishing the local communication link between the first base station and the second base station using the first local IP address and the second local IP address without using a security gateway.

2. The method of claim 1, further comprising:
   in response to determining that the local communication link between the first base station and the second base station is not possible, sending, by the first base station, a first tunnel inner address for the first baseband unit entity of the first base station to the second base station;
   in response to determining not to include the second local IP address for the second baseband unit entity of the second base station in the response, sending, by the second base station, the response to the request to the first base station, the response to the request including a second tunnel inner address for the second baseband unit entity of the second base station; and
   establishing a base-station-to-base-station connection between the first base station and the second base station using the security gateway.

3. The method of claim 1, wherein determining, by the first base station, whether the local communication link between the first base station and the second base station is possible comprises:
   sending, by the first base station, a neighbor solicitation message to the second base station; and
   receiving, by the first base station, a neighbor advertisement message from the second base station.

4. The method of claim 1, wherein determining, by the second base station, whether to include the second local IP address for the second baseband unit entity of the second base station in the response to the request from the first base station comprises:
   checking the request to determine if the first local IP address is included in the request.

5. The method of claim 1, wherein the request to the second base station is sent through the security gateway via one or more IP Security (IPsec) connections, wherein the response to the request is sent through the security gateway via the one or more IPsec connections.

6. A secondary base station, comprising:
electronic circuitry comprising:
an interface to communicatively couple the secondary base station to a network;
wherein the secondary base station is configured to perform at least some processing associated with implementing an air interface to provide wireless service;
wherein the secondary base station is configured to respond to a request from a master base station for an address suitable for establishing a communication link between the master base station and the secondary base station by:
determining whether to include a local IP address for a baseband unit entity of the secondary base station in a response to the request from the master base station; and
in response to determining to include the local IP address for the baseband unit entity of the secondary base station in the response, sending the response to the request to the master base station, the response to the request including the local IP address for the baseband unit entity of the secondary base station; and
wherein the local IP address for the baseband unit entity of the secondary base station is used to establish a local communication link between the master base station and the secondary base station without using a security gateway, wherein the local communication link is used to implement an X2-U interface or an Xn-U interface between the master base station and the secondary base station.

7. The secondary base station of claim 6, wherein the secondary base station is a 5G NR base station, wherein the baseband unit entity of the secondary base station is a CU-UP.

8. The secondary base station of claim 6, wherein the secondary base station is a 4G LTE base station, wherein the baseband unit entity of the secondary base station is a baseband controller.

9. The secondary base station of claim 6, wherein the secondary base station is further configured to:
in response to determining not to include the local IP address for the baseband unit entity of the secondary base station in the response, send the response to the request to the master base station, the response to the request including a tunnel inner address for the baseband unit entity of the secondary base station;
wherein the tunnel inner address for the baseband unit entity of the secondary base station is used to establish a base-station-to-base-station connection between the master base station and the secondary base station using the security gateway.

10. The secondary base station of claim 6,
wherein the local IP address for the baseband unit entity of the secondary base station is a standard IP address or a link-local IP address; and
wherein the local IP address for the baseband unit entity of the secondary base station is an IPV4 address or an IPV6 address.

11. The secondary base station of claim 6, wherein the interface is configured to couple the secondary base station to an EthernetETHERNET network.

12. A master base station, comprising:
electronic circuitry comprising:
an interface to communicatively couple the master base station to a network;
wherein the master base station is configured to perform at least some processing associated with implementing an air interface to provide wireless service; and
wherein the master base station is configured to:
determine whether a local communication link between the master base station and a secondary base station is possible, wherein the local communication link is used to implement an X2-U interface or an Xn-U interface between the master base station and the secondary base station;
in response to determining that the local communication link between the master base station and the secondary base station is possible, send a request to the secondary base station for an address suitable for establishing the local communication link between the master base station and the secondary base station, wherein the request includes a first local network Internet Protocol (IP) address for a first baseband unit entity of the master base station;
receive a response to the request from the secondary base station, wherein the response to the request includes a second local IP address for a second baseband unit entity of the secondary base station; and
establish the local communication link between the master base station and the secondary base station using the first local IP address and the second local IP address without using a security gateway.

13. The master base station of claim 12, wherein the master base station is a 4G LTE base station, wherein the first baseband unit entity of the master base station is a baseband controller.

14. The master base station of claim 12, wherein the master base station is a 5G NR base station, wherein the first baseband unit entity of the master base station is a CU-UP.

15. The master base station of claim 12, wherein the master base station is further configured to:
in response to determining that the local communication link between the master base station and the secondary base station is not possible, send a first tunnel inner address for the first baseband unit entity of the master base station to the secondary base station;
receive the response to the request from the secondary base station, the response to the request including a second tunnel inner address for the second baseband unit entity of the secondary base station; and
establish a base-station-to-base-station connection between the master base station and the secondary base station using the security gateway, wherein the base-station-to-base-station connection between the master base station and the secondary base station is established using the first tunnel inner address of the first baseband unit entity of the master base station and the second tunnel inner address of the second baseband unit entity of the secondary base station.

16. The master base station of claim 12,
wherein the first local IP address for the first baseband unit entity of the master base station is a standard IP address or a link-local IP address; and
wherein the first local IP address for the first baseband unit entity of the master base station is an IPv4 address or an IPV6 address.

17. The master base station of claim 12, wherein the master base station is configured to determine whether the local communication link between the master base station and the secondary base station is possible by:
sending a neighbor solicitation message to the secondary base station; and
receiving a neighbor advertisement message from the secondary base station.

18. A method, comprising:
    determining, by a first base station, whether a local communication link between the first base station and a second base station is possible;
    in response to determining that the local communication link between the first base station and the second base station is possible, sending, by the first base station, a request to the second base station for an address suitable for establishing a communication link between the first base station and the second base station, wherein the request includes a first local Internet Protocol (IP) address for a first baseband unit entity of the first base station;
in response to determining that the local communication link between the first base station and the second base station is not possible, sending, by the first base station, a first tunnel inner address for the first baseband unit entity of the first base station to the second base station;
    determining, by the second base station, whether to include a second local IP address for a second baseband unit entity of the second base station in a response to the request from the first base station;
    in response to determining to include the second local IP address for the second baseband unit entity of the second base station in the response, sending, by the second base station, the response to the request to the first base station, the response to the request including the second local IP address for the second baseband unit entity of the second base station;
    in response to determining not to include the second local IP address for the second baseband unit entity of the second base station in the response, sending, by the second base station, the response to the request to the first base station, the response to the request including a second tunnel inner address for the second baseband unit entity of the second base station;
    establishing the local communication link between the first base station and the second base station using the first local IP address and the second local IP address without using a security gateway; and
    establishing a base-station-to-base-station connection between the first base station and the second base station using the security gateway.

19. The method of claim 18, wherein determining, by the first base station, whether the local communication link between the first base station and the second base station is possible comprises:
    sending, by the first base station, a neighbor solicitation message to the second base station; and
    receiving, by the first base station, a neighbor advertisement message from the second base station.

20. The method of claim 18, wherein determining, by the second base station, whether to include the second local IP address for the second baseband unit entity of the second base station in the response to the request from the first base station comprises:
    checking the request to determine if the first local IP address is included in the request.

* * * * *